United States Patent
Simpson-Young et al.

(10) Patent No.: US 7,191,236 B2
(45) Date of Patent: Mar. 13, 2007

(54) TRANSPARENT TELECOMMUNICATIONS SYSTEM AND APPARATUS

(75) Inventors: William Simpson-Young, Eastwood (AU); Sue-Ken Yap, Lane Cove (AU); John Charles Brook, Stanhope Gardens (AU); François Paradis, Carlton (AU)

(73) Assignee: Canon Kabushiki Kaisha, Tokyo (JP)

( * ) Notice: Subject to any disclaimer, the term of this patent is extended or adjusted under 35 U.S.C. 154(b) by 701 days.

(21) Appl. No.: 09/836,163

(22) Filed: Apr. 18, 2001

(65) Prior Publication Data

US 2002/0029277 A1    Mar. 7, 2002

(30) Foreign Application Priority Data

May 2, 2000 (AU) .................................. PQ7243
May 2, 2000 (AU) .................................. PQ7245

(51) Int. Cl.
G06F 15/16 (2006.01)
G06F 15/177 (2006.01)
G06F 15/173 (2006.01)
H04L 12/26 (2006.01)
H04J 3/16 (2006.01)

(52) U.S. Cl. .................. 709/228; 709/220; 709/230; 370/238; 370/466

(58) Field of Classification Search ........ 709/220–221, 709/227–230, 201; 370/466–469; 358/442
See application file for complete search history.

(56) References Cited

U.S. PATENT DOCUMENTS 6,108,308 A * 8/2000 Flavin et al. ............... 370/238

(Continued)

FOREIGN PATENT DOCUMENTS

| CA | 2249824 | 4/2000 |
|---|---|---|
| EP | 0 893 760 | 1/1999 |
| EP | 0 954 147 | 11/1999 |
| WO | WO 96/41270 | 12/1996 |
| WO | WO 99/59072 | 11/1999 |

OTHER PUBLICATIONS

Goland et al., "Simple Service Discovery Protocol v1.0—Operating without an Arbiter", Internet Engineering Task Force Memo, issue Oct. 28, 1999 (Microsoft Corporation/Hewlett Packard), URL:http://www.upnp.org/download/draftcal_ssdp_v1_03.txt.

(Continued)

Primary Examiner—Wen-Tai Lin
(74) Attorney, Agent, or Firm—Fitzpatrick, Cella, Harper & Scinto

(57) ABSTRACT

Disclosed is a method of establishing a desired communication between an originating entity (102) and a target entity (106). Each entity is coupled to a communication network (100) and has a corresponding profile (112, 142) related to information handled by the entity. Initially a compatibility is determined between the profile (112) of the originating entity (102) and the profile (140) of the target entity (106). If a direct profile compatibility is determined between the originating entity and the target entity, the desired communication are establishing directly between the originating entity and the target entity. If step a direct profile compatibility between the originating entity and the target entity cannot be determined the network is searched to identify an additional entity (108) coupled to the network (100) and having a direct profile compatibility with one of the target or source entity to thereby form a linked entity pair providing communications (112, 124) with the additional entity. This is repeated until a chain of linked entity pairs link the source and target entities.

19 Claims, 21 Drawing Sheets

U.S. PATENT DOCUMENTS

| | | | | |
|---|---|---|---|---|
| 6,128,314 | A * | 10/2000 | Kusunoki | 370/466 |
| 6,202,096 | B1 * | 3/2001 | Williams et al. | 709/230 |
| 6,389,464 | B1 * | 5/2002 | Krishnamurthy et al. | 709/220 |
| 6,578,075 | B1 * | 6/2003 | Nieminen et al. | 709/221 |
| 6,590,677 | B1 * | 7/2003 | Nakamura et al. | 358/442 |
| 6,728,267 | B1 * | 4/2004 | Giese et al. | 370/469 |
| 6,779,004 | B1 * | 8/2004 | Zintel | 709/227 |
| 6,963,784 | B1 * | 11/2005 | Gibbs | 700/94 |
| 2001/0047383 | A1 * | 11/2001 | Dutta | 709/201 |

OTHER PUBLICATIONS

U.S. Appl. No. 09/422,108, filed Oct. 20, 1999.

"HP JetSend: off-the-cuff communication", Core/Networks, Apr. 1998, pp. 49-50, www.byte.com.

F.D. Wright, "Design Goals for an Internet Printing Protocol", Lexmark, Int., Request For Comments, Network Working Group, Apr. 1999, pp. 1 to 44.

V. Tsaoussidis, et al., "An Application-Oriented Cross-Domain Resource Management Schema using CORBA", Internet Workshop, 1999. IWS 99 Okaka, Japan Feb. 18-20, 1999, pp. 53-60.

"Service Location Protocol: An Introduction", <http://www-2.cs.cmu.edu/~pach/mslp/introduction.html> Mar. 23, 1999.

"RFC 2165—Service Location Protocol", <http://www.faqs.org/rfcs/rfc2165.html> Mar. 23, 1999.

"Mini Service Location Protocol Distribution", <http://www-2.cs.cmu.edu/~pach/mslp/index.html> Mar. 30, 1999.

"Mini Service Location Protocol Capabilities", <http://www-2.cs.cmu.edu/~pach/mslp/capabilities.html> Mar. 30, 1999.

"The Jini™ Discovery and Joint Specification (DJ)", <http://www.sun.com/software/jini/specs/jini101specs/boot-spec.html> Nov. 1999.

P. Chandra et al., "Network Support for Application-Oriented QoS", Quality Of Service, 1998 Sixth International Workshop On Napa, CA, May 18-20, 1998, pp. 187-195.

B. Pagurek, et al., "Management of Advanced Services in H.323 Internet Protocol Telephony", Infocom 2000. Nineteenth Annual Joint Conference of the IEEE Computer and Communications Societies, Mar. 26-30, 2000, pp. 91-100.

* cited by examiner

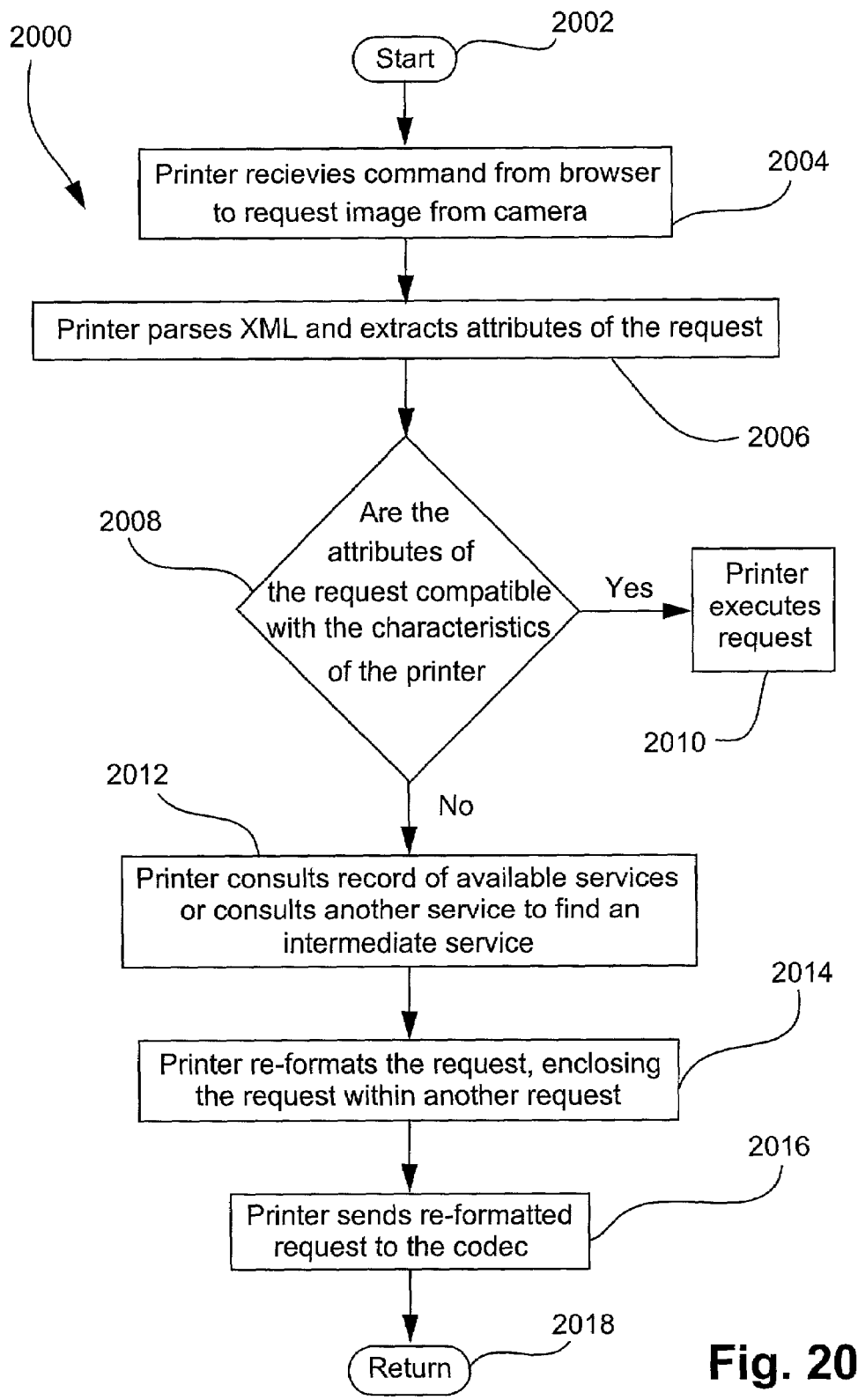

TRANSPARENT TELECOMMUNICATIONS SYSTEM AND APPARATUS

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to the field of flexible telecommunications networks and, in more particularly, to reconfigurable systems. The present invention further relates to reconfigurable systems using Extended Markup Language (XML) messaging as a mechanism for reconfiguration.

BACKGROUND ART

Self-configuring networks to which peripherals devices such as printers can be freely connected include, for example, the Apple Talk™ Network by manufactured by Apple Computers Inc. of USA. Such a network allows, for example, laser printers to be connected at will to the network.

The Internet Engineering Task Force has also made a number of developments aimed at making similar capabilities available in the TCP/IP environment. Such arrangements tend, however, to be relatively inflexible. Thus, for example, although new devices may be connected to a network and may be self-configuring to some degree, there are significant limitations in the variety of devices which can be so connected and which can interact to perform desired functions. Further, known arrangements generally support only point-to-point interoperability. In such a configuration, a new printer can be connected to a local area network (LAN), where personal computers (PC's) previously connected to the network will become aware of that printer. The PC's can thereafter use the printer in a straightforward manner. If, however, a particular PC however does not have an appropriate driver matching the printer, that PC will be unable to use the printer to reproduce print jobs in spite of the PC user possibly being aware that a suitable driver was presently available on the network in a different locations, possibly store at different locations.

SUMMARY OF THE INVENTION

It is an object of the present invention to substantially overcome, or at least ameliorate, one or more disadvantages of existing arrangements.

According to a first aspect of the invention, there is provided a method of automatically establishing a desired communication between an originating device and a target device, said originating device and said target device each having an associated profile, said method comprising steps of:

(i) determining a profile compatibility between said originating device and said target device;

(ii) establishing said desired communication, if a direct profile compatibility between said originating device and said target device is found, said establishing being directly between said originating device and said target device; and (iii) establishing said desired communication, if said direct profile compatibility between said originating device and said target device is not found, said establishing being indirectly between said originating device and said target device by incorporating at least one additional device, said at least one additional device having an associated profile, said incorporation forming linked device pairs among said originating device, said target device and said at least one additional device, whereby said incorporation establishes a direct profile compatibility between each said linked pair of said devices.

According to another aspect of the invention, there is provided a method of establishing a desired communication between an originating entity and a target entity, each said entity being coupled to a communication network and having a corresponding profile related to information handled by said entity, said method comprising steps of:

(i) determining a compatibility between the profile of said originating entity and the profile of said target entity;

(ii) if step (i) determines a direct profile compatibility between said originating entity and said target entity, establishing said desired communication directly between said originating entity and said target entity; and (iii) if step (i) fails to determine said direct profile compatibility between said originating entity and said target entity, establishing said desired communication indirectly between said originating entity and said target entity by interposing at least one additional entity between said originating entity and said target entity to form a chain of said entities, each said additional entity having an associated profile, said interposing forming linked entity pairs between adjacent entities in said chain, whereby said interposing establishes a direct profile compatibility between each said linked pair of said entities.

According to another aspect of the invention, there is provided a method of establishing a desired communication between an originating entity and a target entity, each said entity being coupled to a communication network and having a corresponding profile related to information handled by said entity, said method comprising steps of:

(i) determining a compatibility between the profile of said originating entity and the profile of said target entity;

(ii) if step (i) determines a direct profile compatibility between said originating entity and said target entity, establishing said desired communication directly between said originating entity and said target entity; and (iii) if step (i) fails to determine said direct profile compatibility between said originating entity and said target entity:

(a) specifying one of said originating entity and said target entity as a searching entity;

(b) searching said network from said searching entity to identify an additional entity coupled to said network and having a direct profile compatibility with said searching entity to thereby form a linked entity pair providing communications between said searching entity and said additional entity;

(c) specifying said additional entity as said searching entity;

(d) repeating steps (b) and (c) until the non-specified one of said originating entity and said target entity from step (a) is identified as said additional entity; and (e) establishing said desired communication between said originating entity and said target entity via said linked entity pairs of devices.

According to another aspect of the invention, there is provided a method of automatically establishing a process between an originating device and a target device, each said device having an associated profile, said method comprising steps of:
(i) determining a profile compatibility between said originating device and said target device;
(ii) establishing said process, if a direct profile compatibility between said originating and said target device is found, said establishing being directly between said originating device and said target device, whereby said originating device communicates a message, using a messaging protocol, to said target device, said process being dependent upon said message; and
(iii) establishing said process, if said direct profile compatibility between said originating and said target device is not found, said establishing being indirect between said originating device and said target device, by incorporating at least one additional device, said at least one additional device having an associated profile, said incorporation forming linked device pairs among said originating device, said target device and said at least one additional device, said incorporation establishing both a direct profile compatibility between each linked pair of said devices, and a compatible mapping of said message from said originating device to said target device.

According to another aspect of the invention, there is provided a method of establishing a process between an originating entity and a target entity, each said entity being coupled to a communication network and having a corresponding profile related to information handled by said entity, said method comprising steps of:
(i) determining a compatibility between the profile of said originating entity and said target entity;
(ii) if step (i) determines a direct profile compatibility between said originating entity and said target entity, establishing said process directly between said originating entity and said target entity, whereby said originating entity communicates a message, using a messaging protocol, to said target entity, said process being dependent upon said message; and
(iii) if step (i) fails to determine said direct profile compatibility between said originating entity and said target entity:
  (a) specifying one of said originating entity and said target entity as a searching entity;
  (b) searching said network from said searching entity to identify an additional entity coupled to said network and having a direct profile compatibility with said searching entity to thereby form a linked entity pair providing communications using said messaging protocol between said searching entity and said additional entity;
  (c) specifying said additional entity as said searching entity;
  (d) repeating steps (b) and (c) until the non-specified one of said originating entity and said target entity from step (a) is identified as said additional entity; and
  (e) establishing said desired communication between said originating entity and said target entity via said linked entity pairs of devices to thereby establish said process and a compatible mapping of said message from said originating device to said target device.

According to another aspect of the invention, there is provided a transparent telecommunications system comprising:
a communication network;
a plurality of devices coupled to said network, each said device having associated therewith at least one service, each said service having a corresponding profile related to information handled by said service, each said service comprising:
  means for determining a compatibility between the profile of said service and a further said service with which functional communications are intended;
  means for establishing said functional communications between said service and said further service where a direct profile compatibility was found by said means for determining; and
  means for searching said network to identify an intermediate service having a profile compatibility with said service and by which intermediate functional communications between said service and said intermediate service can be established.

According to another aspect of the invention, there is provided apparatus for communicating with a first device and a second device, comprising:
receiver for receiving, from the first device, a first request including a first command to process image data;
generator for generating a second request including the first command and a second command to process the image data the subject of the first command; and
sender for sending the second request generated by said generator to said second device.

According to another aspect of the invention, there is provided a device for coupling to a communications network, said device comprising:
a performance engine configured for performing a service and representing at least one of a source and target of information communicable via said network;
a device profile characterising said information for performance of said service;
a discovery/announcement element configured for communicating said device profile via said network to identify at least one further device or service accessible via said network and representing at least a complementary one of a target and source respectively of said information; and
a command generator configured for communicating said information between said performance engine, and at least one device or service identified by said discovery/announcement element.

According to another aspect of the invention, there is provided a program which, when running on a computer device, enables said device to function as apparatus including:
a performance engine configured for performing a service and representing at least one of a source and target of information communicable via said network;
a device profile characterising said information for performance of said service;
a discovery/announcement element configured for communicating said device profile via said network to identify at least one further device or service accessible via said network and representing at least a complementary one of a target and source respectively of said information; and a command generator configured for communicating said information between said performance engine, and at least one device or service identified by said discovery/announcement element.

According to another aspect of the invention, there is provided a computer readable medium comprising a computer program for establishing a desired communication between an originating entity and a target entity, each said entity being coupled to a communication network and having a corresponding profile related to information handled by said entity, said computer program comprising modules for performing a method comprising the steps of:
  (i) determining a compatibility between the profile of said originating entity and the profile of said target entity;
  (ii) if step (i) determines a direct profile compatibility between said originating entity and said target entity, establishing said desired communication directly between said originating entity and said target entity; and
  (iii) if step (i) fails to determine said direct profile compatibility between said originating entity and said target entity:
    (a) specifying one of said originating entity and said target entity as a searching entity;
    (b) searching said network from said searching entity to identify an additional entity coupled to said network and having a direct profile compatibility with said searching entity to thereby form a linked entity pair providing communications between said searching entity and said additional entity;
    (c) specifying said additional entity as said searching entity;
    (d) repeating steps (b) and (c) until the non-specified one of said originating entity and said target entity from step (a) is identified as said additional entity; and
    (e) establishing said desired communication between said originating entity and said target entity via said linked entity pairs of devices.

Preferred implementations have the significant advantage of supporting automatic interworking between devices, even if the devices display, in the first instance, a service description profile mismatch, this typically occurring without user intervention. This advantage is achieved in a network environment by automatically establishing self-generated chains of interposing devices where necessary to establish tandem interworking, and in particular, deriving an unexpected advantage from the structure of the XML markup language.

BRIEF DESCRIPTION OF THE DRAWINGS

One or more embodiments of the present invention will now be described with reference to the drawings, in which.

DETAILED DESCRIPTION INCLUDING BEST MODE

Figure 1:
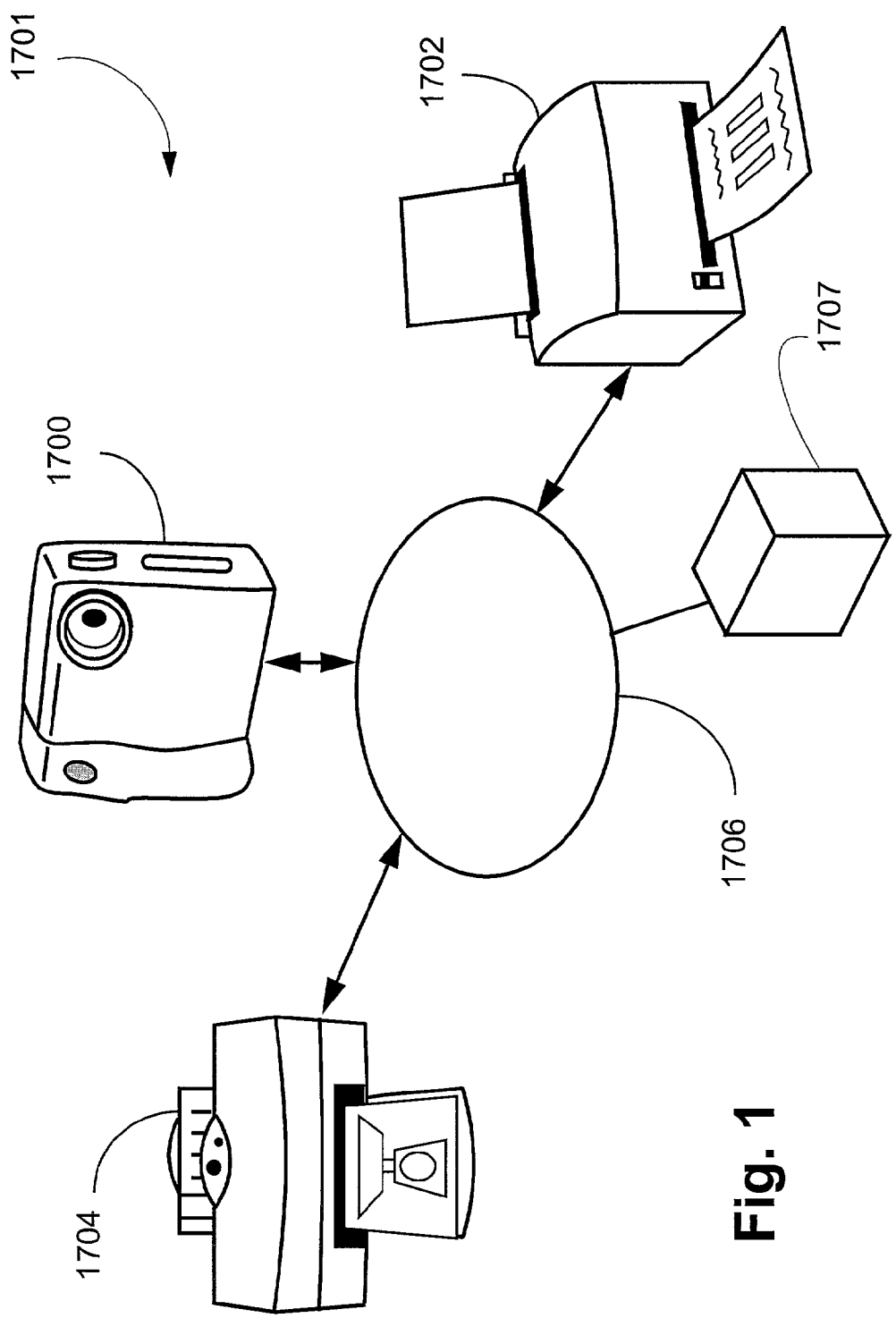
FIG. 1 illustrates a system in which embodiments of the invention can be practiced.

Where reference is made in any one or more of the accompanying drawings to steps and/or features, which have the same reference numerals, those steps and/or features have for the purposes of this description the same function(s) or operation(s), unless the contrary intention appears.

FIG. 1 illustrates a telecommunications system 1701 formed about a communications network 1706. The network 1706 typically has associated therewith a server computer 1707. It can be assumed for the purposes of this description that the network 1706 supports the Internet suite of communication protocols commonly known as "IP".

As seen, a user has connected a digital camera 1700 to the network 1706, with a desire to print a number of digital images stored in internal memory (not shown) of the camera 1700 via the network 1706. A digital camera is essentially an electronic camera and recorder device and is often termed a "camcorder". Generic use of such devices often finds such devices simply referred to as "cameras". Two printers 1702 and 1704 are also shown connected to the network 1706. In order for the images to be printed there must firstly be awareness by the user that the printers 1702 and 1704 are connected to, and thus accessible via, the network. Further, interworking must be possible between the camera 1700 and at least one of the printers 1702, 1704. For example if the images are to be printed with a resolution of 500 dpi (ie. dots per inch), at least one of the printers 1702, 1704 must support the required resolution.

Figure 21:
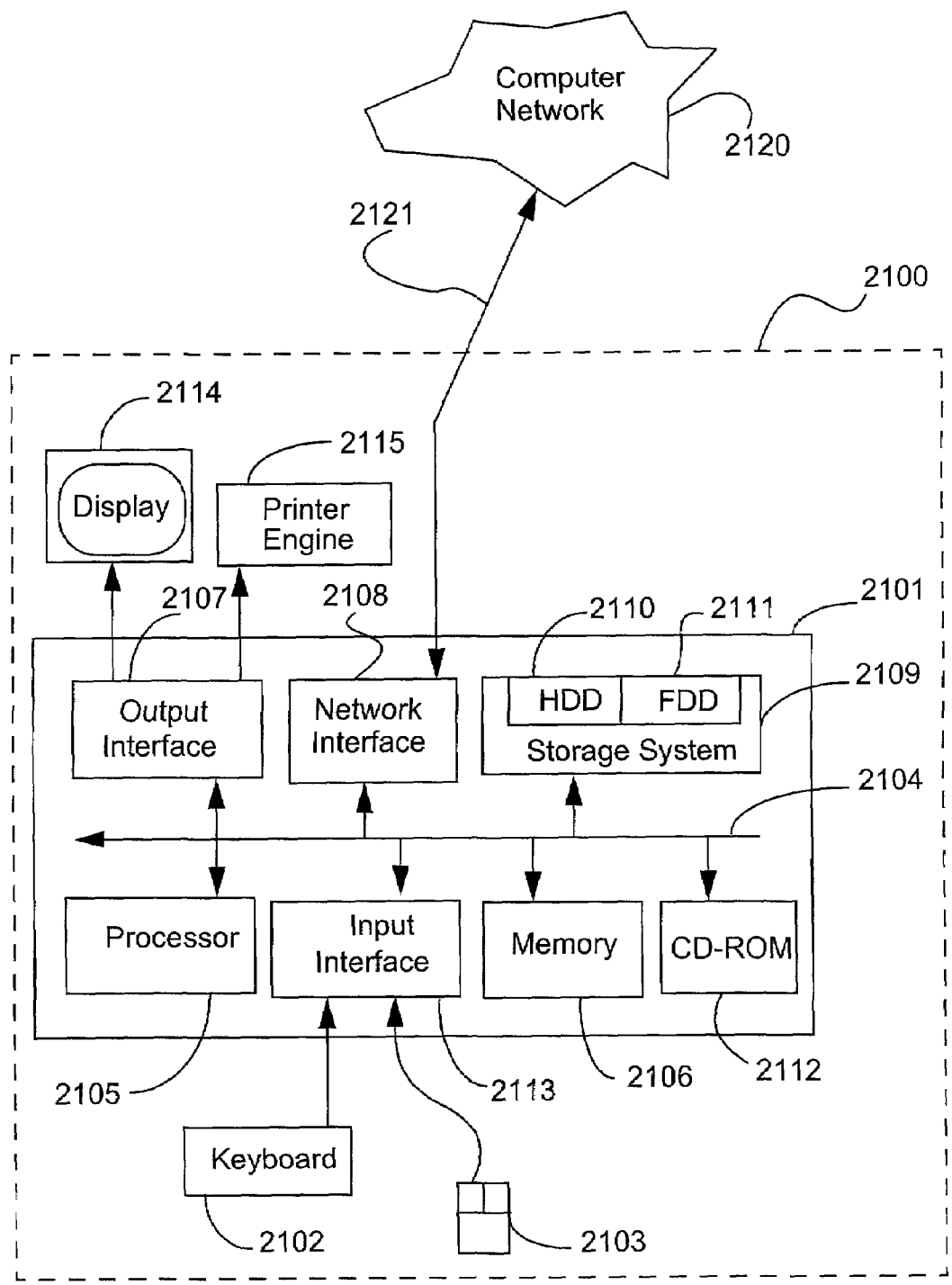
FIG. 21 is a schematic block diagram representation of a device useful in the arrangements described.

For the purposes of the present description, each of the devices indicated in FIG. 1 may be considered as a variant of a general-purpose computer system 2100, such as that shown in FIG. 21, with the extent of variation depending upon the specifics of any function or functions the device is required to perform. Generally, the function(s) are interpreted and/or implemented using software, such as an application program, executing within the device and configured where appropriate to communicate with other devices in the system 1701. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for transparent telecommunications the subject of the present description.

As seen from FIG. 21, the generic computer system 2100 incorporates a computer module 2101, to which may be coupled input devices such as a keyboard 2102 and mouse 2103, and output devices such as a printer engine 2115 and a display device 2114. For example, in the camera 1700, the input devices would typically be supplemented by a lens and image capture arrangement, and the keyboard 2102 would typically be formed by a reduced function keypad. The mouse 2103 may be formed by a number of scroll keys, the display 2114 formed by an LCD screen, and the printer engine may be omitted. Conversely, in the printers 1702 and 1704, the mouse 2103 would typically not be present and the keyboard 2102 would typically be formed by a reduced function keypad. A status display may be formed by indicator lights or an LCD panel may be used. The printer engine 2115 would be incorporated thereby providing for the print function to be performed. In some instances, the computer system 2100 may be configured as a traditional desktop computer system, or as a server.

A network interface 2108 incorporating a modem is used by the computer module 2101 for communicating to and from a communications network 2120, for example connectable via a telephone line 2121 or other functional medium able to convey the TCP/IP communications. The network 2120 may be a Local Area Network (LAN) or a Wide Area Network (WAN), or the Internet.

The computer module 2101 typically includes at least one processor unit 2105, a memory unit 2106, for example formed from semiconductor random access memory (RAM) and read only memory (ROM), an input interface 2113 for any input components such as the keyboard 2102 and the mouse 2103, and an output interface 2107 for any output components such as the display 2114 or printer engine 2115. A mass storage system 2109 may be used depending on the desired function to be performed and where appropriate can include a hard disk drive 2110 and/or a floppy disk drive 2111. A CD-ROM drive 2112 may also provided as a non-volatile source of data to supplement the ROM within the memory 2106. A magnetic tape drive (not illustrated) may also be used.

The components 2105 to 2113 of the computer module 2101, typically communicate via an interconnected bus 2104 and in a manner which results in a conventional mode of operation of the computer system 2100 known to those in the relevant art. Examples of stand-alone computers on which the described arrangements can be practised include IBM-PC's and compatibles, Sun Sparcstations or alike computer systems evolved therefrom. It will be appreciated that functionally and structurally modified versions of the computer system 2100 may be configured to implement devices such as the printers 1702, 1704 and the camera 1700.

Typically, the application program is resident in the memory 2106 or 2109 where necessary and read and controlled in its execution by the processor 2105. Intermediate storage of the program and any data fetched from the network 2120 may be accomplished using the semiconductor memory 2106, possibly in concert with mass storage 2109. In some instances, the application program may be supplied to the user encoded on a CD-ROM or floppy disk and read via the corresponding drive 2112 or 2111, or alternatively may be read by the user from the network 2120 via the interface 2108. Still further, the software can also be loaded into the computer system 2100 from other computer readable media including magnetic tape, a ROM or integrated circuit, a magneto-optical disk, a radio or infra-red transmission channel between the computer module 2101 and another device, a computer readable card such as a PCMCIA card, and the Internet and Intranets including e-mail transmissions and information recorded on websites and the like. The foregoing is merely exemplary of relevant computer readable media. Other computer readable media may alternately be used.

Figure 2:
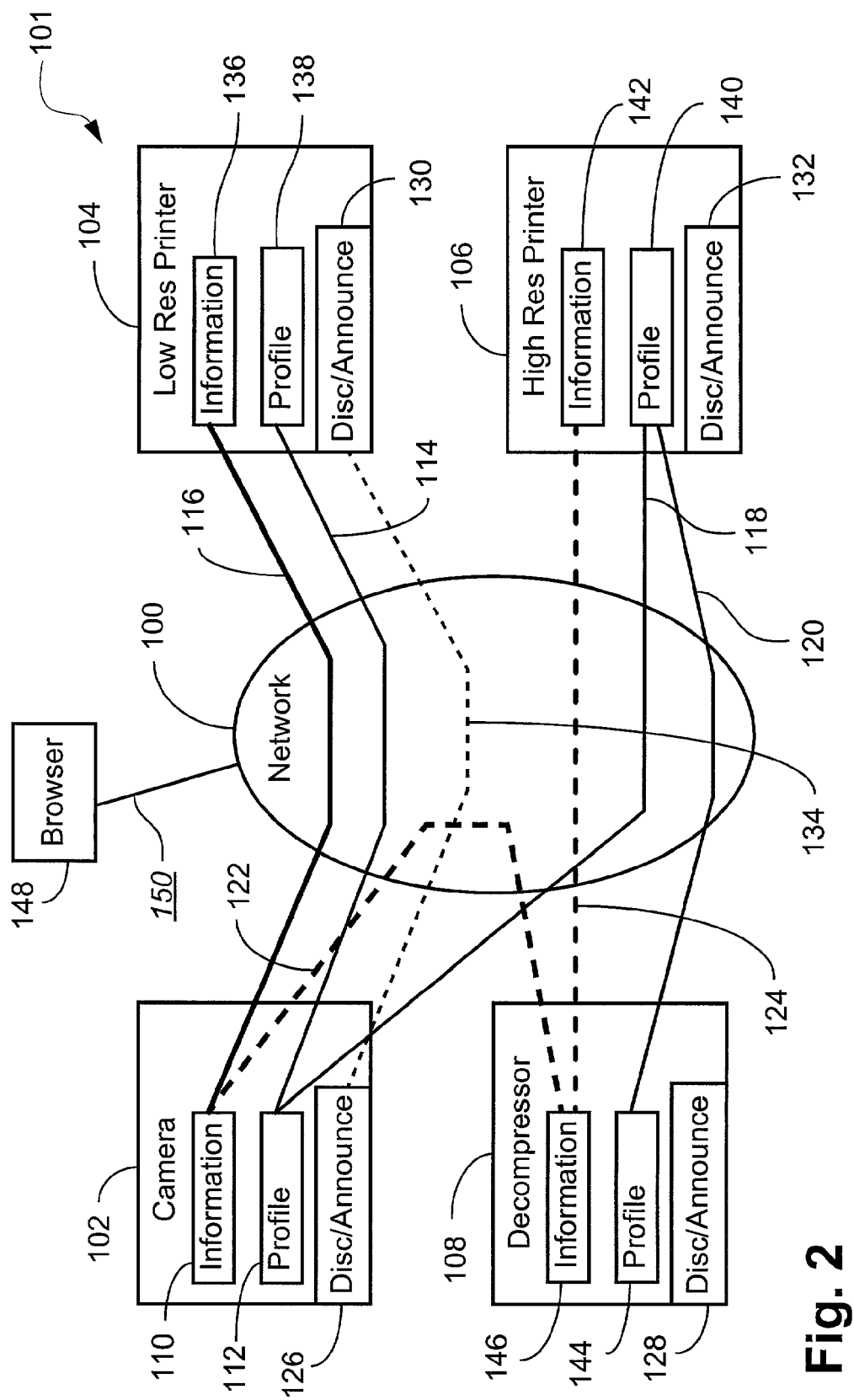
FIG. 2 depicts devices connected in a system according to a one particular implementation.

FIG. 2 depicts a system 101 for transparent telecommunications. A user has connected a camera 102 to a network 100, to which are also connected a number of other devices or services 104, 106 and 108. In the context of the present description, a "device" can provide or perform a "service". Similarly, a "service" may be supported or performed by a "device". As such, terms "devices" and "services" can be used interchangeably. The user wishes to print the images stored in the camera 102. Each device 102–108 is depicted as having an information type, a profile, and a discovery/announcement process (eg. 110, 112 and 126 respectively in relation to the device 102). As noted below, not all devices require discovery and announcement capabilities, and it is accordingly sufficient for certain devices to support an announcement capability only. The information 110, with respect to the device 102, represents the information type and/or the information itself, the intended interpretation being clear from the context.

In the present description, an information type is typically declared and/or defined in the device profile 112. In general, devices of interest transmit, receive, or process different types of information. For example, the camera 102 records visual images, stores the images in an internal memory as the "information" 110. When so commanded, the camera 102 transmits the stored information 110 on an output line to an external device such as a TV display monitor. The profile 112 characterises the information 110. Devices such as the camera 102 can typically operate in different communication modes. Accordingly, the camera 102 can, in a first mode of operation, record images in a compressed format, storing the resultant compressed data in internal memory to obtain the longest "filming time". Alternatively, the camera 102 can in a second mode, operate in an uncompressed mode, storing uncompressed data with higher quality, but at a cost of providing less recording time. Each such mode has an associated profile 112 characterising service attributes of the associated information 110. Therefore, the camera 102 can have a number of different profiles 112.

Turning to the issue of "network awareness", each of the devices 102–108 has a discovery/announcement capability designated 126–132 respectively. It is not necessary for every device to have both an announcement and a discovery capability, however preferably, devices should have at least an announcement capability.

Service Discovery is a process that provides for services to discover other nearby services on the network 100. Remote services, such as those services described later in more detail with reference to FIG. 14, need not be discovered this way. Almost any Service Discovery system, for example the Jini™ discovery service developed by Sun Microsystems Inc. of the USA, or the protocol referred to as "miniSLP" and described in RFC 2165 entitled "Service Location Protocol" can typically be used in the arrangement of FIG. 2. The service discovery service used in the described arrangements assumes that multicast data delivery is configured for the network 100 and a local-use multicast address is established to cover the local site in which the network 100 may operate.

Network services multicast an announcement as soon as they connect to the network 100. Such services also multicast at regular intervals, to handle lost packet situations. Services can also multicast whenever a new service appears on the network 100 that was previously unknown to "established" service. Accordingly, a network service learns of the new service, and the new service learns of the "old" service shortly after connection to the network 100. Multicast service announcements also list the services present on the network 100. Therefore, if a service detects an announcement which doesn't list the recipient, then the recipient knows to re-announce itself to the entire network 100.

The Service Discovery process described above can result in each service learning about any other service as soon as both are connected to the network 100. Such immediate discovery is however not mandatory, particularly in larger networks. The standard mode of operating for the arrangement of FIG. 2 is for every service to receive a Service Description of every other service. This is efficient for small local networks, however, in relation to large sites, it is preferable to make use of a Service Description Directory, such representing a repository of Service Descriptions for devices/services connected to the network 100. The Service Description Directory may for example reside in the server 1707, in the arrangement of FIG. 1.

Service Discovery is not a preferred place to transfer significant amounts of information about the service itself, such as the service aspects contained within the corresponding profile. The basic intent of Service Discovery is to tell other services the Universal Resource Indicator (URI) identifying the particular service. Other services can then contact that service to obtain the Service Description in a profile matching process. Some small amount of profile information may however be exchanged during the discovery/announcement process, thereby reducing the need for every service to seek or obtain the Service Description of every other service. In the protocol used in the present arrangement, two pieces of extra information are therefore provided, those being the "personality" and "type". "Type" is a text string, such as "printer", to describe the service and indicate default information if required, such as an icon for use with a browser service.

If a service is shut down cleanly before removal from a network, then the service it will multicast a Service Deletion message. If a service crashes or is otherwise removed from a network without being able to issue a Service Deletion message, then other services will notice that the former service ceases to send its regular multicast announcement and will delete their corresponding reference to the former service after testing for its presence.

After devices discover the presence of each other on the network 100, the devices preferably communicate using the Hypertext Transfer Protocol (HTTP). The devices can parse an XML message which is sent to the HTTP port of the device using the "POST" command of HTTP. A more detailed description of protocols used in the present arrangements is provided with reference to FIG. 8. Examples of XML syntax, commands, data, and service descriptions are found in the Appendix to this description.

As noted above, each device/service has a personality and a type. The "personality" describes the behaviour of the device/service in the network environment. The personality can be represented by one or more of the following descriptors:

NO_SERVICE. This descriptor is used when indicating that a service is being deleted from the local environment.

PASSIVE. This descriptor means that the service will not actively seek to use other services on the local network. As a practical matter, a PASSIVE service will not list other services in its service discovery announcements, nor is there any need for other services to ensure that a passive service knows about them.

ACTIVE. This is a normal network device or service that is interested in other services on the network.

COMPUTE. This is a service which provides a platform in which new services can be started.

REMOTE. A remote service provides services that are discovered in other ways than by service announcements. A REMOTE service need not advertise itself locally at all.

The "type" is a text string that describes the service offered in a simplified, and possibly coarse manner. Services can access the Service Description to obtain the detailed exact information.

Typical type names include "printer", "camera", "browser", "DVC", "DTV", "control", "compute", and "service". Any unknown name will be treated as a general undefined "service". The following type names mentioned above deserve particular comment:

"control" means the device can act as a user control point for some external service. Typically such may include a Graphical User Interface (GUI), generally associated with a pointing device such as a computer mouse. Voice or text based control are alternative/additional possibilities. As with printing, "control" does not specify what control protocols the device supports. It is necessary for other services to access the corresponding Service Description to obtain such detailed information.

"compute" means a device that can be used to start other services. For example, consider a printer that requires a conversion service but has insufficient memory requirements to run the conversion service itself. The printer can request the "compute" service to start the required conversion service.

Returning to FIG. 2, when the camera 102 is initially connected to the network 100, the associated discovery/announcement process 126 searches for and identifies other devices which are connected to the network 100. This is performed in cooperation between the respective discovery/announcement processes 126–132 in each device 102–108 as described above. The camera 102 thereby discovers the device 104, which is a low resolution printer, by means of respective discovery/announcement processes 126 and 130. The process of discovery/announcement is depicted by the dotted line 134. The camera 102 may also discover the low level printer 104 by means of another service, for example a browser 148 which is connected to the network 100 by a connection 150.

Figure 4:
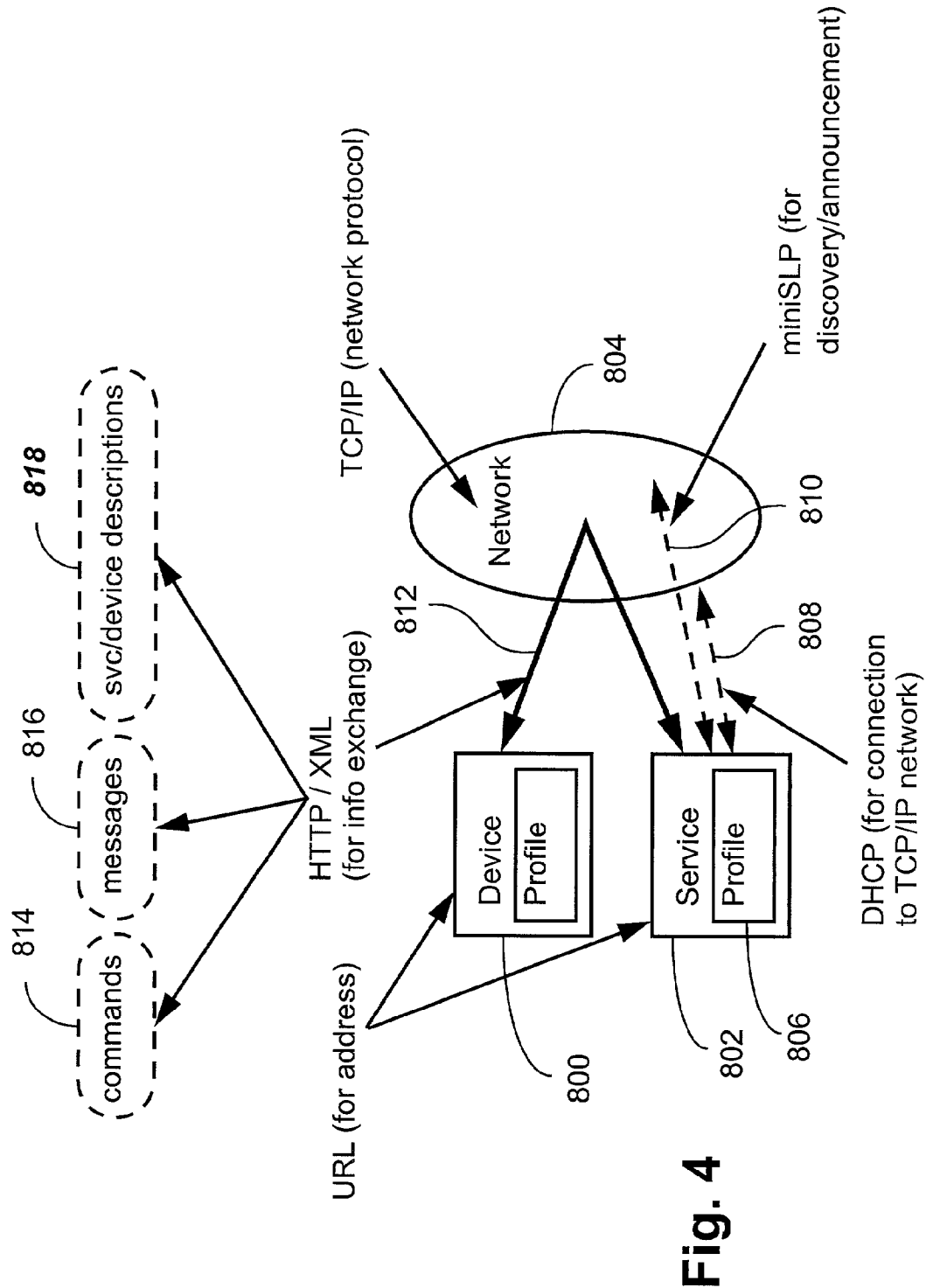
FIG. 4 shows exemplary network protocols used in the system of FIG. 2.

XML messaging is the communication protocol of preference used between the devices, as noted in the description relating to FIG. 4.

An example provided below makes use of discover/announcement protocol options, which include the protocol referred to as "miniSLP" mentioned above.

Like other Service Directory protocols, miniSLP assumes that multicast is configured for the local network 100 and services/devices use a local-use multicast address set up to cover the local site. In miniSLP, the services multicast an announcement as soon as they connect to the network. In the case of miniSLP, two pieces of extra information are provided: the personality (one of a small number of possibilities describing behaviour) and type, which is just a test string such as "printer" to describe the service and indicate a default icon to use if required, in the browser 148.

EXAMPLE 1

XML Sequence Illustrating Discovery/Announcement

When the browser 148 is informed via the service discovery protocol that the camera 102 has come on-line in the system 101 of FIG. 2, the browser 148 asks for the camera 102 to send its description, in a sequence as follows:
(i) the camera 102 comes on-line;
(ii) MiniSLP or Jini or other suitable discovery and/or announcement protocol informs the browser 148 of the presence and address of the camera 102;
(iii) the browser 148 sends an update request (describe command) to the camera 102 using XML code fragment {1} below:

```
<Message from="http://host/browser"              {1}
    to=http://host/camera
    time="Tue Mar 23 14:12:10 EST 1999">
<describe/>
</Message>
```

(iv) the camera 102 then answers with its description according to code fragment {2} below:

```
<Message from="http://host/camera"               {2}
    to="http: //host/browser"
    time="Tue Mar 23 14:12:11 EST 1999">
<update>
<device url="http: //host/camera"
    xmlns="http: //dochost//"
    xmlns:camera="http: //dochost//camera.html">
<identity name="PowerShot" class="camera"
    manufacturer="Canon" model="PS350"
    owner="CMIS" version="1.3c"/>
<location slot="38a" room="141" floor="1"
    building="e6b"/>
<comment comment="Demo camera"/>
<content>
    <camera thumbnails base="thumbs/"
refbase="images/"
    start="301" end="308"
    suffix=".jpg" format="JPEG"/>
<camera: images base="images/"
    start="301" end="308"
    suffix=".jpg" format&"JPEG"/>
</content>
</update>
<commands>
    <getData><content><camera: thumbnails/></content></
        getData>
    <getData><content><camera: images/></content></
        getData>
</commands>
</Message>
```

Figure 18:
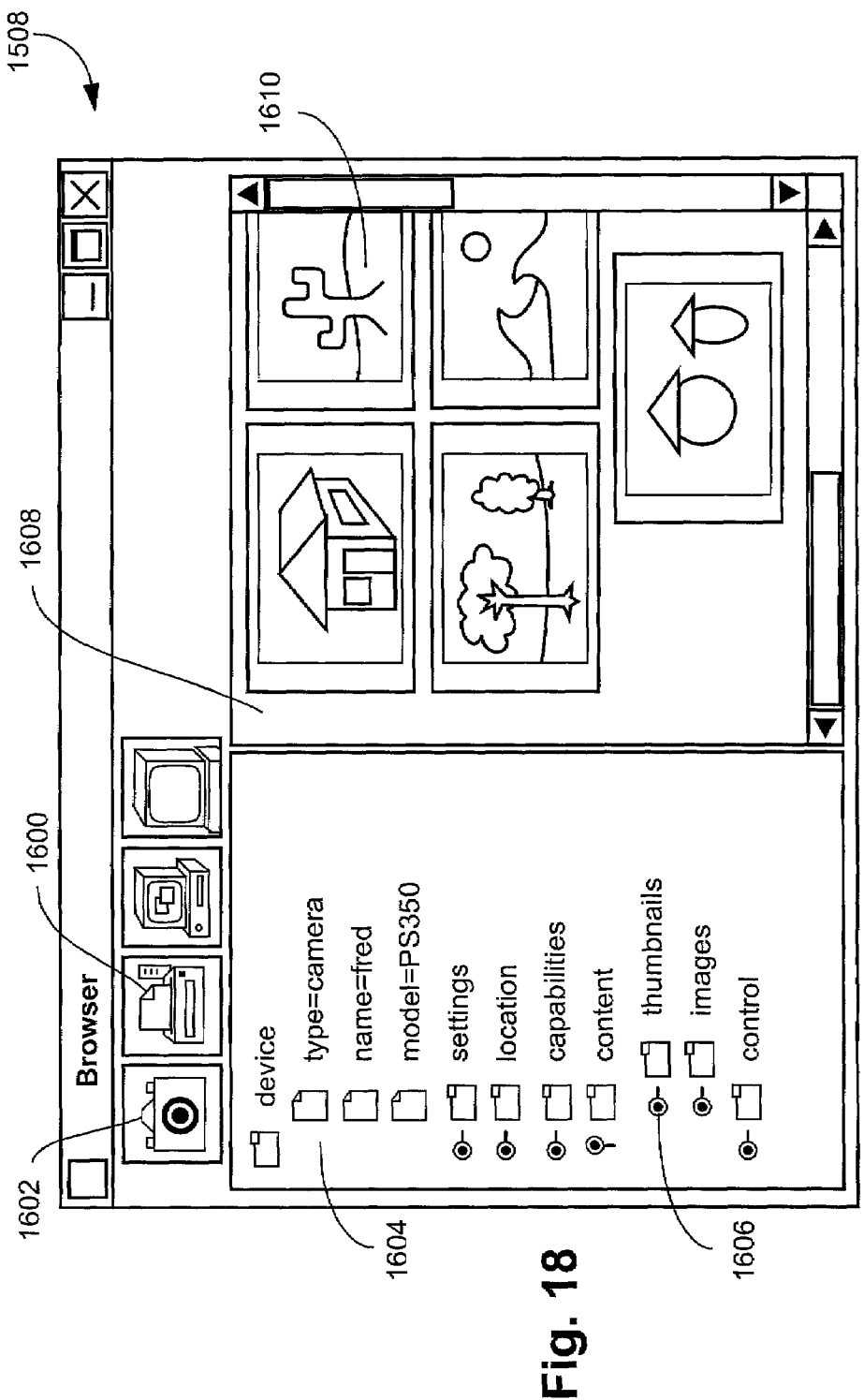
FIG. 18 shows detail for a GUI in the example of FIG. 16.

The browser 148 can then display, as seen in FIG. 18 and later described in detail, the description directly. Alternatively, the browser 148 can wait for the user to select, using a mouse click for example, the camera icon 1602 (see FIG. 18) corresponding to the camera 102. In a further alternative, the browser 148 may take some other action with the newly obtained camera description.

The discovery/announcement processes of all devices 102–108 connected to the network 100 are sufficiently standardised and compatible to support a minimum level of communication to be established. Aspects of minimum compatibility and backward compatibility are described in further detail in regard to FIG. 3. A device can, in general, search for and discover other devices in a number of different ways. FIG. 2 in this regard illustrates a method based on cooperative search and discovery by all devices. Alternatively, a device need not actively "discover" other devices, but can instead be a passive "listener", being informed by other devices of their presence. Further, a registry server can provide a Service Description Directory service which is accessible to other devices and services on the network 100.

Figure 3:
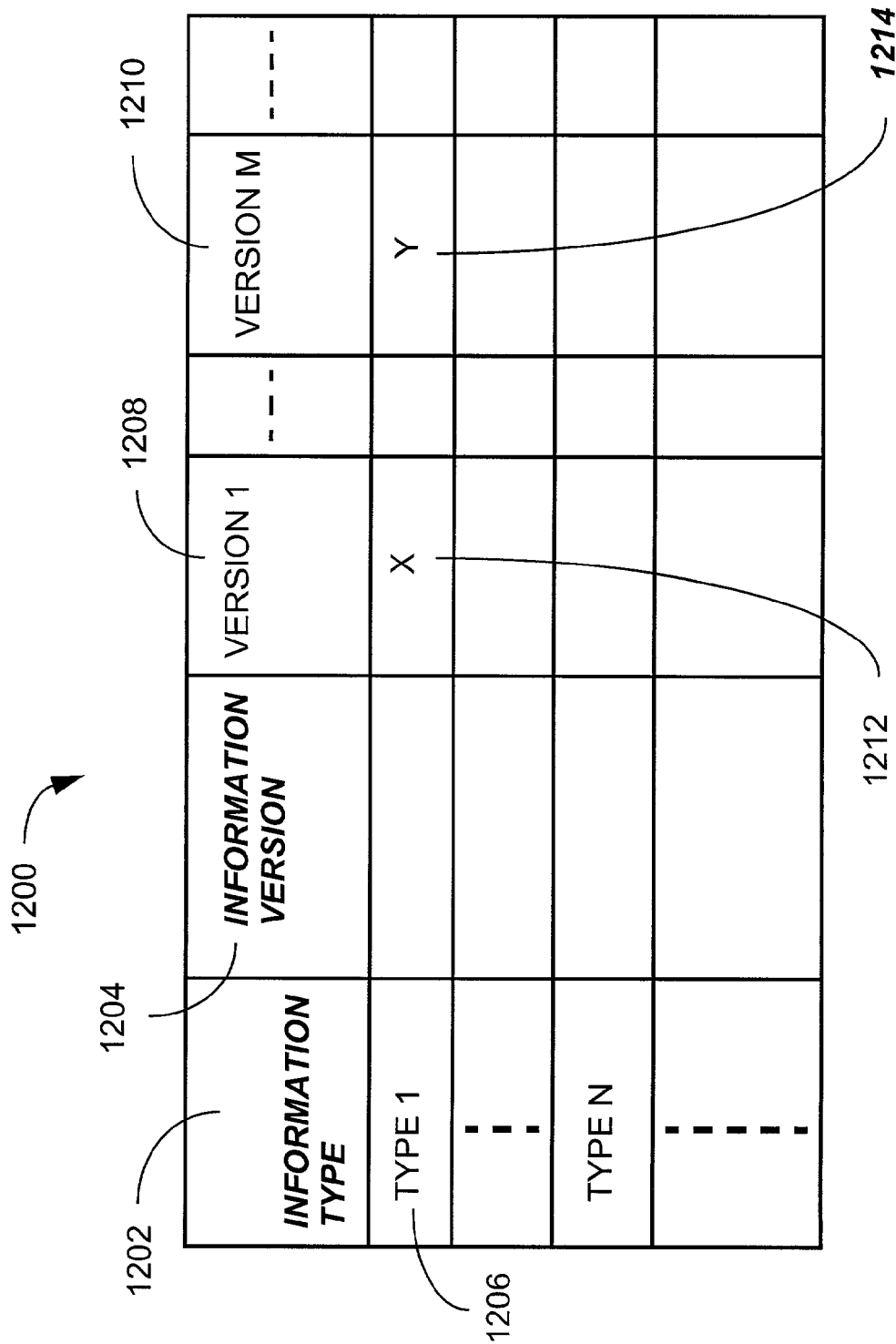
FIG. 3 illustrates minimum and backward compatibility between devices in the system of FIG. 2.

FIG. 3 depicts the aspects of minimum compatibility, and also forward and backward compatibility. This applies to both the discovery/announcement process, and to the profile matching process. In the description below in relation to FIG. 3 only therefore, the term "information" relates both to the information feature 110 and to the discovery/announcement process 126 in device 102 in FIG. 2. Considering a number of different devices connected to a network, a table 1200 as shown in FIG. 3 describes the relationship between the different devices in terms of their information type (in a column 1202), and their information version (in a column 1204). Different information types, in different versions, will generally be present in a system. For example, a device X (designated 1212) supports information type 1 (designated 1206) in version 1 (designated 1208). A device Y (designated 1214) also supports information type 1 (ie. 1206) however in version M (designated 1210). Version 1 represents for example the earliest and/or the most basic version of a particular information type. The arrangement illustrated provides that all devices supporting, for example, information type 1 (ie 1206), irrespective of the information version which they support, can establish communications at least at the version 1 level. Therefore, all devices supporting information type 1 (ie. 1206) can communicate at least at the version 1 (ie. 1208) level. Further, backward compatibility is provided to some extent, which means that a first device supporting information type 1 in version M (column 1210) and a second device supporting information type 1 in a later version N are, despite the apparent version incompatibility, nonetheless often able to communicate at the version M level.

FIG. 4 illustrates a further arrangement, providing more detail about the individual elements in the system, and in particular, the preferred network protocols. The preferred protocol suite is, however, merely illustrative, and other protocol suites can be utilised. The present arrangement uses the Internet Protocol and related standards as detailed in the Internet Engineering Task Force Specification RFC 1122 entitled "Requirements for Internet hosts-communication layers". The required network protocol is defined in the specification RFC 2068 entitled "Hypertext Transfer Protocol-HTTP/1.1". One or more devices 800 and/or one or more services 802 are connected by physical connections (not shown, but which may be a mixture of wired and/or wireless connections) to a network 804. The network protocol is TCP/IP. Typically, the service 802 has an associated profile 806 which provides a description of the characteristics and attributes of the service 802.

The configuration of a network layer connection to the network 804 by a service 802 makes use of the DHCP protocol 808, this protocol being described in RFC 2131 entitled "Dynamic Host Configuration Protocol". The discovery/announcement process by which services and devices identify each other is performed using the miniSLP protocol 810, discussed above. Information exchange between a device 800 and the service 802 depicted by the line 812 is performed using the HTTP protocol described in RFC 2608 entitled "Hypertext Transfer Protocol-HTTP/1.1", while structured information exchange is performed using the XML protocol. Information on XML can be obtained from World Wide Web Consortium Recommendation REC-XML-19980210 entitled "Extensible Markup Language (XML)". HTTP/XML communication is made up of commands 814, messages 816, and service/device descriptions 818.

Returning to FIG. 2, once all the devices 102–108 have discovered each other, thus having established network awareness between the camera 102 and the other devices 104–108, the next issue is interworking compatibility. The profile processes 112 and 138, which as noted are associated with respective information 110 and 136, establish whether the desired print job can be performed. As described in relation to FIG. 3, the profile processes 112, 138, 140 and 144 for all the devices 102–108 connected to the network 100 are sufficiently standardised to be capable of at least a minimum degree of communication. Therefore, an initiating device, such as the camera 102, can identify the population of devices connected to the network, and is, at least to some extent, aware of their attributes and capabilities. The user of the camera 102 is therefore aware, by means of the discovery/announcement process previously discussed, of the low resolution printer 104 which is attached to the network 100. The user is also aware, by virtue of the "personality" and "type" information received during announcement/discovery, of basic service attributes of the printer 104. This information may be sufficient to initiate a print command immediately, however in general, exchange of service description information is required. Therefore, when the user of the camera 102 commands the camera 102 to print the stored images 110 on the printer 104, the following process takes place. In the first instance, communication depicted by a line 114 is established between the profile processes 112 and 138 which are associated with the camera 102 and the printer 104 respectively.

Thus, for example, if the information 110 in the camera 102 is desired to be printed at a resolution 500 dpi, and the printer 104 is able to print at the desired resolution, then the respective profile processes 112 and 138 conclude that the two devices 102 and 104 are compatible. Once such a "match" between the respective profile processes 112 and 138 is established, communications as designated by the line 116 is established between the camera 102 the printer 104 respectively, and the images in the camera 102 are printed on the printer 104.

An XML messaging sequence, incorporating the browser 148 into the process, can now described. Firstly, recall that the camera 102 has announced itself and sent profile information to the browser 148 according to the XML code fragments {1} and {2} provided above. The printing process continues with the user selecting a "thumbnails" icon in the camera description, after which the browser 148 sends the selected element to camera 102. The browser knows that thumbnails can be selected because of the commands element in the corresponding device description of the camera 102.

EXAMPLE 2

Sequence of a Browser Retrieving Thumbnail Images from a Camera (i) The browser 148 sends a getData request for one or more elements to the camera 102 as shown in code fragment {3} below:

```
<Message from="http: //host/browser"                    {3}
    to="http: //host/camera"
    time="Tue Mar 23 14:13:05 EST 1999">
<getData><camera:thumbnails base="thumbs/"
    refbase="images/" start="301" end="308" suffix=".jpg"
    format ="JPEG"/></getData>
</Message>
```

(ii) The camera 102 answers as follows, noting that along with each thumbnail image, the camera 102 encapsulates a command which is to be used to retrieve the associated reference image (<getData>). This command will be typically retained by the browser 148 and associated with each retrieved thumbnail image. This is exemplified in code fragment {4} below:

```
<Message from="http://host/camera"                      {4}
    to="http: //host/browser"
    time="Tue Mar 23 14:13:06 EST 1999">
<data>
        <image format="JPEG" name="thumbs/301.jpg"/>
            <BASE64>image data</BASE64>
            <getData format="JPEG" name="images/301.jpg"/>
        </image>
        <image format="JPEG" name="thumbs/302 .jpg">
        etc. (8 images)
</data>
</Message>
```

The browser 148 need not have any understanding of the command because the command is intended for the camera 102, not the browser 148. The browser 148 need merely send the command back to the camera 102 at an appropriate point, such as when a user selects a thumbnail for viewing, the browser 148 can then interpret that action as requiring it to send the associated getData command back to the camera, which then yields a larger version of the image for viewing. These associated commands sent with data to a host device or service can also include graphical user interface (GUI) elements and attributes. A GUI may be implicitly built around retrieved data and associated commands inside a host that need not have any comprehension of the commands or associations (the GUI elements and attributes will typically be understood by the host). It is further possible to link multiple devices or services and their various states or conditions into controlling the execution or transmission of associated commands, as well as introducing procedural or scripted code. These facilities can be supported without requiring the host device or service to have or require any understanding of the potential actions it might be hosting.

When the browser 148 receives the thumbnail image data from the camera 102, the browser 148 typically displays the thumbnail in a content pane of the browser 148, as seen in FIG. 18. There is no "print" command per se in the present arrangement, however instead the printer 104 receives a <data> command that it interprets as a print command. Instead of sending the actual image, the browser 148 sends an image reference to the printer 104. The browser 148 can send to the printer 104 the command to retrieve the image from the camera 102 (getData).

EXAMPLE 3

Sequence of a Browser Directing a Printer to Print an Image from a Camera

The user typically selects a thumbnail image 1610 displayed in the browser window 1508 and requests to print the related full size image by any reasonable means (including implicit means within the selection process). The browser 148 then sends the getData (or other) command of the camera 102 associated with that thumbnail image to the desired printer 104. The printer 104 and its capabilities or attributes have been previously identified to the browser 148 in the fashion described above. The camera 102 and its capabilities or attributes may or may not have been previously identified to the printer 104.

(i) The browser 148 sends an image reference to the printer 104. Instead of sending the actual image, the browser 148 sends to the printer 104 the associated command (getData) to retrieve the image from the camera 102. The browser 148 need not have any understanding of the associated command (getData) that the browser 148 had has sent to the printer 104. This is exemplified in code fragment {5} below:

```
<Message from="http: //host/browser"                {5}
    to="http: //host/printer"
    time="Tue Mar 23 14:14:01 EST 1999">
<data url="http://host/camera">
    <getData format="JPEG" name="images/301.jpg"/>
</data>
</Message>
```

(ii) The printer 104 then sends a request for the image to the camera 102, the request being identified by the name space or URL in the command received by the printer 104. The printer 104 need not have any understanding of the command (getData) it sends to the camera 102. This is exemplified in code fragment {6}:

```
<Message from="http: //host/printer"                {6}
    to="http://host/camera"
    time="Tue Mar 23 14:14:02 EST 1999">
<getData format="JPEG" name="images/301.jpg"/>
</Message>
```

(iii) The camera 102 sends the image to the printer 104, as seen in code fragment {7}:

```
<Message from="http://host/camera"                {7}
    to="http://host/printer"
    time="Tue Mar 23 14:14:03 EST 1999">
<data>
    <image format="JPEG" name="images/301.jpg">
    <BASE64>image data</BASE64>
    <getData format="JPEG" name="images/301.jpg"/>
    </image>
</data>
</Message>
```

When the printer 104 receives the message of code fragment {7}, the printer 104 can recognise that on this occasion actual image data has been received. The printer 104 can then print the image data. Additional interaction with the user may be requested by the printer 104, by sending messages to the browser 148 for example, to present to the user a dialogue asking the user to specify the number of copies to be printed.

Communications of this type can be embedded into XML documents as references, or as URI's to data which is required to be included, before an operation can be completed. For example, an XML document intended for printing can reference camera images, using the message syntax indicated. The XML document also contains textual content for rendering. The image references can be resolved by the preceding method, prior to rendering.

Each network service has a service description used in the profile matching process. Such can be formed by an XML file describing substantially static information about the device. Tables A4 to A6 in the Appendix provide more details and examples of such a facility. Explicitly, the XML description covers information that changes on human time scales, such as seconds or preferably longer. A further file called "status" may be provided to contain more rapidly changing information.

The information in the Service Description is intended to allow other services to plan how to use the service. Examples of information that may appear include:
Supported resolution;
Physical location;
Supported commands (with version number);
Currently loaded paper tray;
Available images; and
Supported image formats.

Service Description information is available from at least four sources as follows:
Static information about the hardware or software provided by the manufacturer.
Information that is entered and updated by the owner of the device such as location, access control and owner's public key;
Information that the service generates during its operation by examining its own internal state, for example loaded paper, error status, images or video available; and
Information that relates to the capabilities of the machine, such as personality; type; and supported commands.

One service can ask another to notify the former when the Service Description of the other service changes. This is particularly useful for a service like the browser 148 which presents information about the state of the service (eg. the printer 104) to a user. For example, the user can see what paper is currently loaded in the printer 104 or perhaps if a scanner is connected to the network at that point in time.

The Service Description of a printer specifies that it understands, for example, the "Line Printer Protocol (LPR)" described in IETF RFC 1179. Another service can use that to send print jobs to the printer. The service communication protocol uses TCP/IP.

Each service is identified by a Universal Resource Indicator (URI), in a manner corresponding to a web page on the World Wide Web (WWW). Just as on the WWW, preferred implementations of the present disclosure use HTTP for communication. HTTP has three basic communication mechanisms:
GET. This operation is used when a user selects a link in a web browser. The browser GETs the web page addressed by the link and displays the web page.

POST. This is commonly used on the web when a user enters data in a form and submits the form to the host page. The form data is sent and the web server returns a replacement page which typically reports the success of the submission.

PUT. This operation is sometimes used for file uploads.

The arrangements described herein use POST. However instead of sending web form data, the arrangement of FIGS. 2 and 4 sends an XML file that describes a network command. The response received is not a displayable web page but rather another piece of XML giving a response to the network command. Typically, the response merely indicates success or failure, but complex data can be also returned.

XML is a way of structuring information that looks very much like HTML used in web pages. In fact, well formed HTML is substantially a subset of XML designed to describe how to layout text and other information on a browser page.

Profile processes, including aspects of compatibility establishment, can be implemented in a number of ways, depending on system priorities. A simplest process is to seek an exact match with a profile name or type. Another option is to pre-grade partial matches (eg an exact resolution match but not a print-size match). A further option is to create profiles of profile matches. For example, meta-meta data can be used to describe the extent to which partial matches are preferable, one over another.

A number of criteria in accordance with which compatibility can be established are presented in Table 1. Many options exist for how a device or service or a consulted discovery or directory service may select a suitable intermediate service or services. The options can be selected statically or dynamically based on the priorities of the system or its implementors.

TABLE 1

| Intermediate Service Selection Criteria | Explanation | Issues/Examples (and/or combinations are possible) |
|---|---|---|
| Static priority | Selection decisions are based on permanent criteria. | I/O matching, quality-matching, etc. |
| Dynamic priority | Selection decisions can change. eg. could be based on the job details, user requirements, network and/or service activity level, etc. | Job or media cost, speed, processing requirements, storage requirements, quality, etc. |
| I/O Matching | Device/service attributes are compared. The simplest model is to compare only the nearest port in the stream, ie. don't check the service's I/O function, only its nearest interface. | This simple method can have drawbacks such as not controlling the length of a chain (or the time to build it); no guarantee of finding the best chain or any complete chain; potential loss of quality or increase in job processing time with added intermediate services. |
| Function & I/O matching | Device/services are matched based on their nearest port in the stream and another property such as function or other port matching, etc. | This method provides a better guarantee of matching a service to the local needs. It still does not guarantee completion of a chain (eg. if a required service is missing then the constraints might be too tight to find an alternative & more indirect chain) |
| Semi-random matching or annealed matching, etc | Device/services are matched based on partially constrained data with the level of constraint varying under some conditions. | This method might allow more optimal selection of a best-match chain or a near, best-match chain. Many methods are possible, and the intent is to overcome the possibly undesirable effect of local minima in the 'chain space' of available services. |
| Directory or Discovery services | Provision of lists of available services, optionally along with additional information suggesting best fits for current job criteria (speed, cost, quality, etc). | A service can collect and/or provide information about the network to any other service. It can also be used in a global management capacity to allow some global control of the inherently local nature of chain-building. |
| Grouped services | Provision of lists or service structures or conglomerates in which a single service is identified but in reality the service is a conglomerate. | A recommended strategy for any stable network for providing optimal chain-building for predictable jobs with typical cost, quality and speed criteria. The localised chain-building method need not know or care how a service conglomerate is constructed or what it is constructed of because only its interfaces and external functional description & attributes are relevant in the chain-building process. |
| Pre-selection or manual specification. | A device or service could have a preset chain description encoded. | This hard-coded chain-building method can fail easily if a specified device is not available. A less brittle approach is possible if some alternatives or only partial preselection is hard-coded, giving the chain-building operation some limited choices. |

Devices are typically configured to establish sufficient communication to obtain information on operations supported by the device, and associated versions thereof. This is generally performed using a "get description" operation in XML, this operation fetching a description, in XML, of the device. In FIG. 2, the camera 102 has discovered the printer 106 which is, in fact, a "high resolution display". The camera 102 does not know about such devices, however a "device description" in the high resolution display says that the display is equivalent to the printer 104. This tells the camera 102 enough to be able to use the printer 106.

The aforementioned description in relation to FIG. 2 related to establishment of direct communication between an initiating device, in that example the camera 102 and a target device, being the printer 104. In that example, therefore, the camera 102 succeeded in itself identifying a desired target device, in this case the printer 104.

FIG. 2 further depicts a more complex scenario in which the camera 102 has also discovered that a high resolution printer 106 is available on the network 100. In addition to the compressed and normal recording modes previously described, the camera 102 is further capable of a high resolution recording mode using compressed data. The user wishes to make use of this high resolution printer 106, however when respective profile processes 112 and 140 of the camera 102 and high resolution printer 106 communicate, as depicted by the line 118, it is discovered that the information 110 in the camera 102 cannot, according to the information type 142, be directly processed by the high resolution printer 106. This is because the printer 106 cannot directly input the high resolution compressed data of the information 110.

At this point, however, the high resolution printer 106 does not merely reject the print job sent from the camera 102. Instead, the printer 106 directs a self generating chaining process by which the printer 106 searches for other devices on the network which can be interposed between the printer 106 and the camera 102, to provide the necessary interworking, if such is possible. The printer 106, by searching the network 100, identifies a decompressor device 108 also present on the network 100. This is an example of "pull service delivery", as against "push service delivery", both of which concepts will be described in further detail in relation to FIGS. 5 to 7. Taking into account the previous communication between the profile processes 112, 140 associated with the camera 102 and high resolution printer 106, subsequent communication between the respective profile processes 140 and 144 of the high resolution printer 106 and the decompressor device 108, are sufficient to establish that interworking is possible by use of a tandem communications arrangement. In the present "pull" example, the printer 106 requests the decompressor 108 to fetch data from the camera 102. This request is nested inside the request from the printer 106 to the decompressor 108 for the decompressed data, as will be described in the XML code fragments provided in Example 4 below. It is noted that Example 4 makes reference to an encoder/decoder, commonly referred to as a "codec", instead of a mere "decompressor". The tandem arrangement entails the camera 102 sending the print job depicted by information 110 to the decompressor 108. The decompressor 108 decompresses the received information 110 and sends the decompressed information 146 to the high resolution printer 106 which is able to print this decompressed information. The tandem communications established between the camera 102 and decompressor 108, and between the decompressor 108 and the high resolution printer 106 are depicted by dashed lines 122 and 124 respectively.

Figure 5:
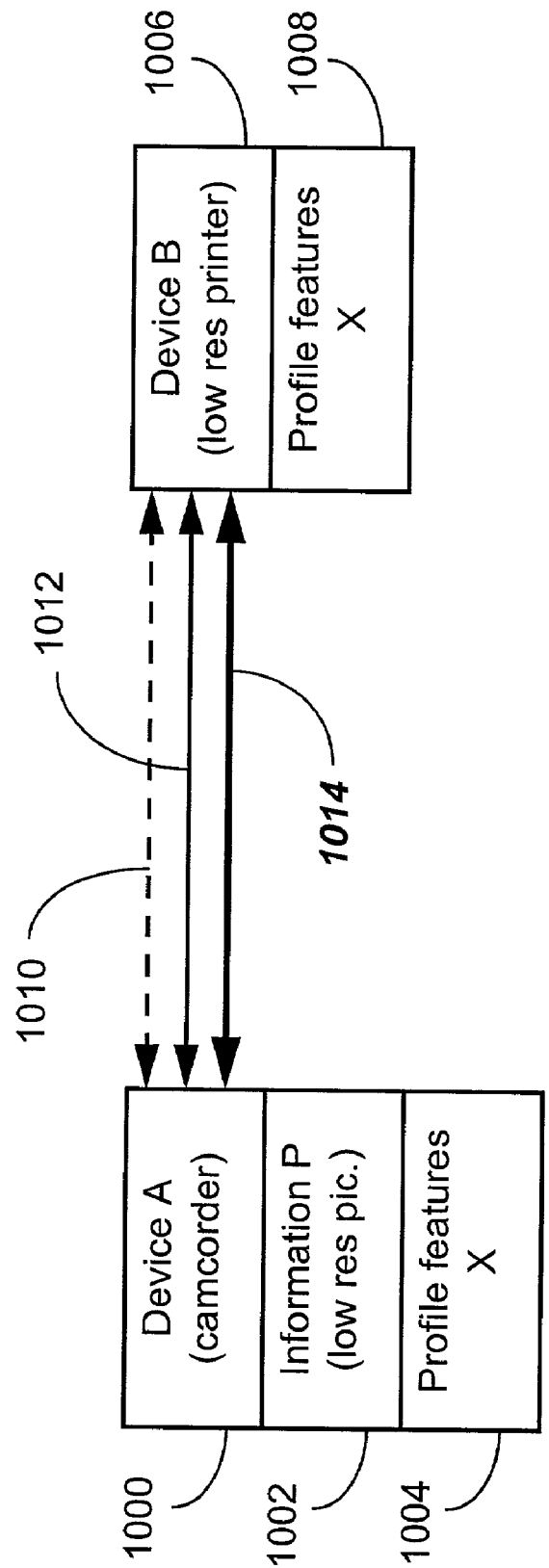
FIG. 5 illustrates direct acquisition of a target device.
Figure 6:
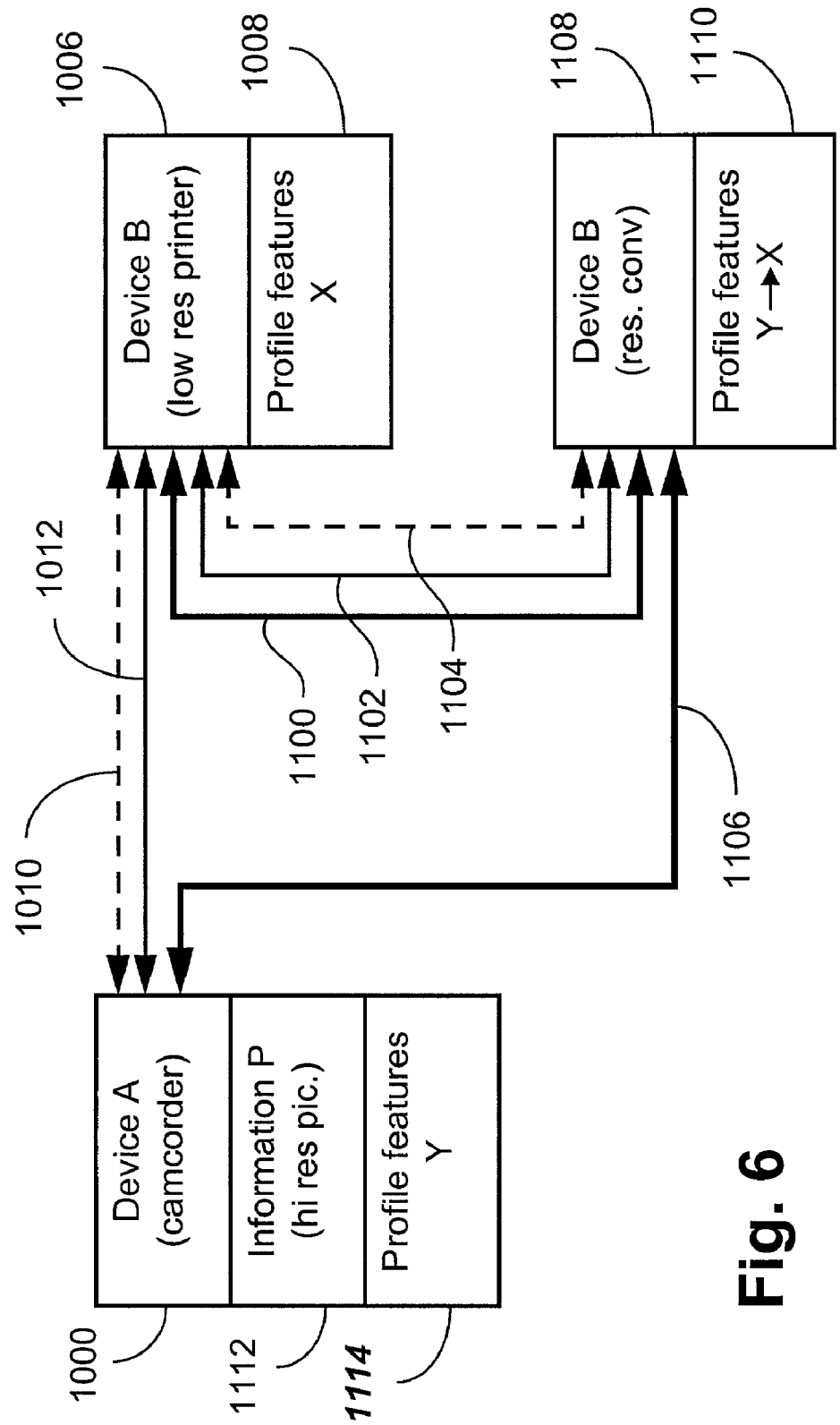
FIG. 6 shows a "pull service provision" using self-generating chaining for a single interposing device.
Figure 7:
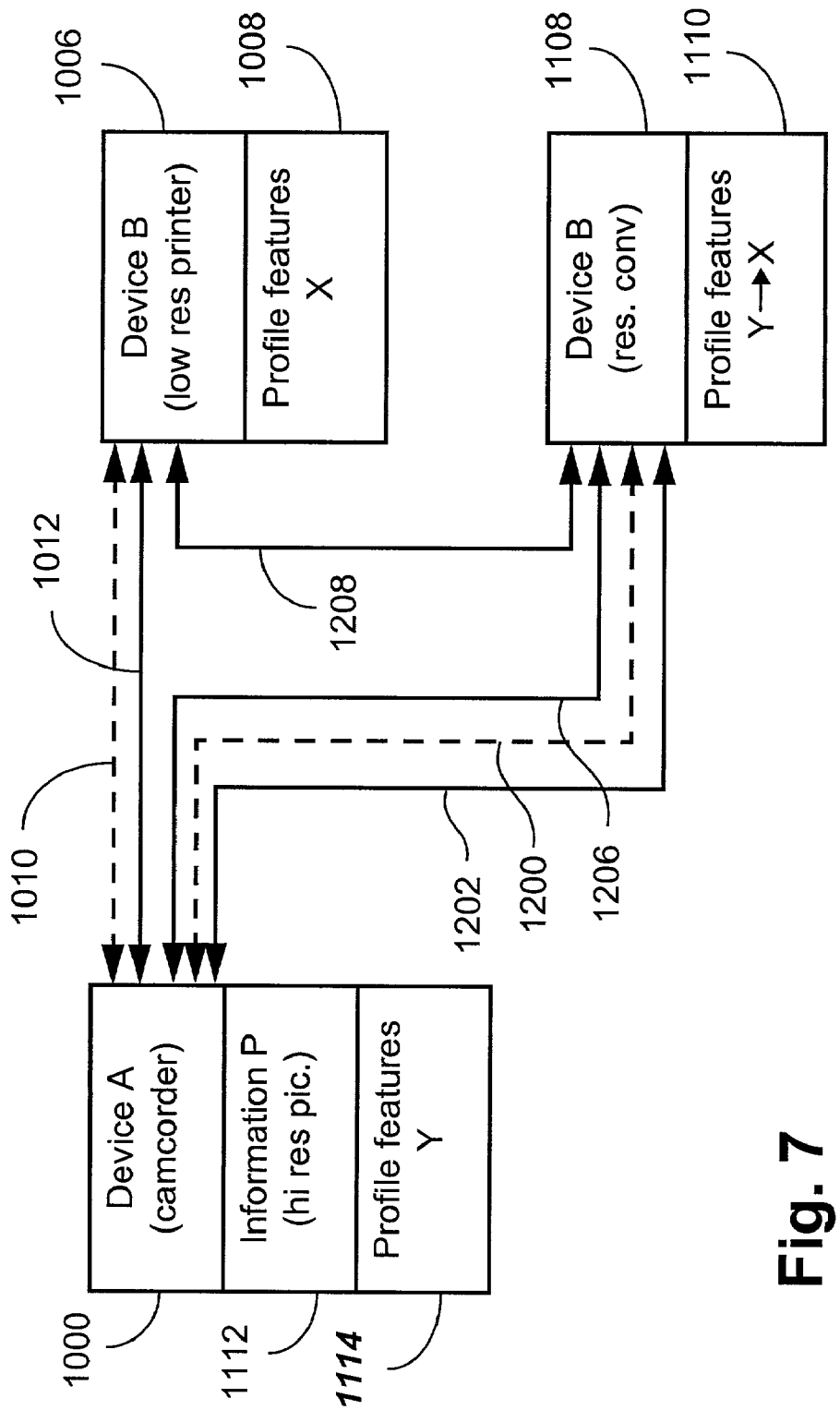
FIG. 7 shows "push service provision" using self-generating chaining for a single interposing device.

FIGS. 5 to 7 provide a more general description of the self generating chaining process applicable to the arrangement of FIG. 2 and introduced above. FIG. 5 illustrates the establishment of direct communication between an initiating camcorder 1000 and a target low resolution printer 1006. The camcorder 1000, via a user thereof, wishes to print information 1002, which is low resolution image information. The information 1002 has a profile "X" designated as 1004. The camcorder 1000 discovers a low resolution printer 1006 by means of a discovery/announcement process depicted by a dashed arrow 1010. The camcorder 1000 and printer 1006 exchange/negotiate respective profile information 1004, 1008 as depicted by a solid arrow 1012, concluding that both devices support profile feature X. It is noted that the profile 1008 of the printer 1006 also is "X" as shown in FIG. 5. Thereafter, the camcorder 1000 and low resolution printer 1006 establish communications as depicted by an arrow 1014 whereby the camcorder 1000 transmits its low resolution picture information 1002 to the low resolution printer 1006, which in turn prints the desired output. This is an example of direct acquisition by the camcorder 1000 of the desired target low resolution printer 1006, in this case, both devices having a common profile feature "X" designated as 1004, 1008 respectively. The profile features 1004, 1006 represent information types/versions as previously described in relation to FIG. 3, where the aspects of minimum and backward version compatibility were described.

FIG. 6 shows the camcorder 1000, which in this case contains high resolution picture information 1112, which is associated with the profile feature "Y" 1114. The camcorder 1000 or an additional device (not shown), discovers, as depicted by the dashed arrow 1010, the low resolution printer 1006, which has a profile feature "X" (ie. 1008). The camcorder 1000 or other device (eg. a browser), commands the printer 1006 to retrieve picture information from the camcorder 1000 (in a "pull" service provision approach). At this juncture, there is an apparent mismatch between the camcorder 1000 and the low resolution printer 1006. However, the printer 1006 initiates a "self generating chaining 'pull' process" by which it discovers, as depicted by the dashed arrow 1104, a "resolution conversion device" 1108, which is capable of being interposed between the profile feature Y 1004 and the profile feature X 1008.

Criteria provided in Table 1 above can be used to establish chaining priorities and approaches. The device 1108 has an interworking profile feature "Y→X" (ie. 1108), which can be considered as having a "Y" profile at one interface, and an "X" profile at another interface. Therefore, the device 1108 can interwork between the two other devices 1000, 1006 having respective profiles "Y" and "X". The "Y" profile of the camcorder 1000 thus matches the "Y" profile of the resolution conversion device 1108, and the "X" profile of the resolution conversion device 1108 matches the "X" profile of the printer 1006. The low resolution printer 1006 ascertains the profile feature 1110 by a process depicted by the arrow 1102. Having ascertained, by means of the self generating chaining process described, that the resolution conversion device 1108 can be interposed between the camcorder 1000 and the printer 1006, the printer 1006 directs the camcorder 1000 and the resolution conversion device 1108 to establish communications denoted by the arrows 1106 and 1100, thus enabling the high resolution picture information 1112 to be transmitted to the resolution conversion device 1108 as depicted by a line 1106, after which the converted information (converted from high resolution to low resolution suitable for the printer 1006) is transmitted to the low resolution printer 1006 as depicted by a line 1100. The description provided above is directed to high and low resolution printers. The following example addresses a similar situation, however the example is directed in particular towards images in two different formats, namely a first format conforming to the Joint Photographic Experts Group (JPEG) standard and denoted by (.jpg), and secondly, to a bit-mapped format (BMP) generally denoted by (.bmp).

EXAMPLE 4

XML Code Sequence of Pull Service Provision with Camera/printer Mismatch.

Figure 20:
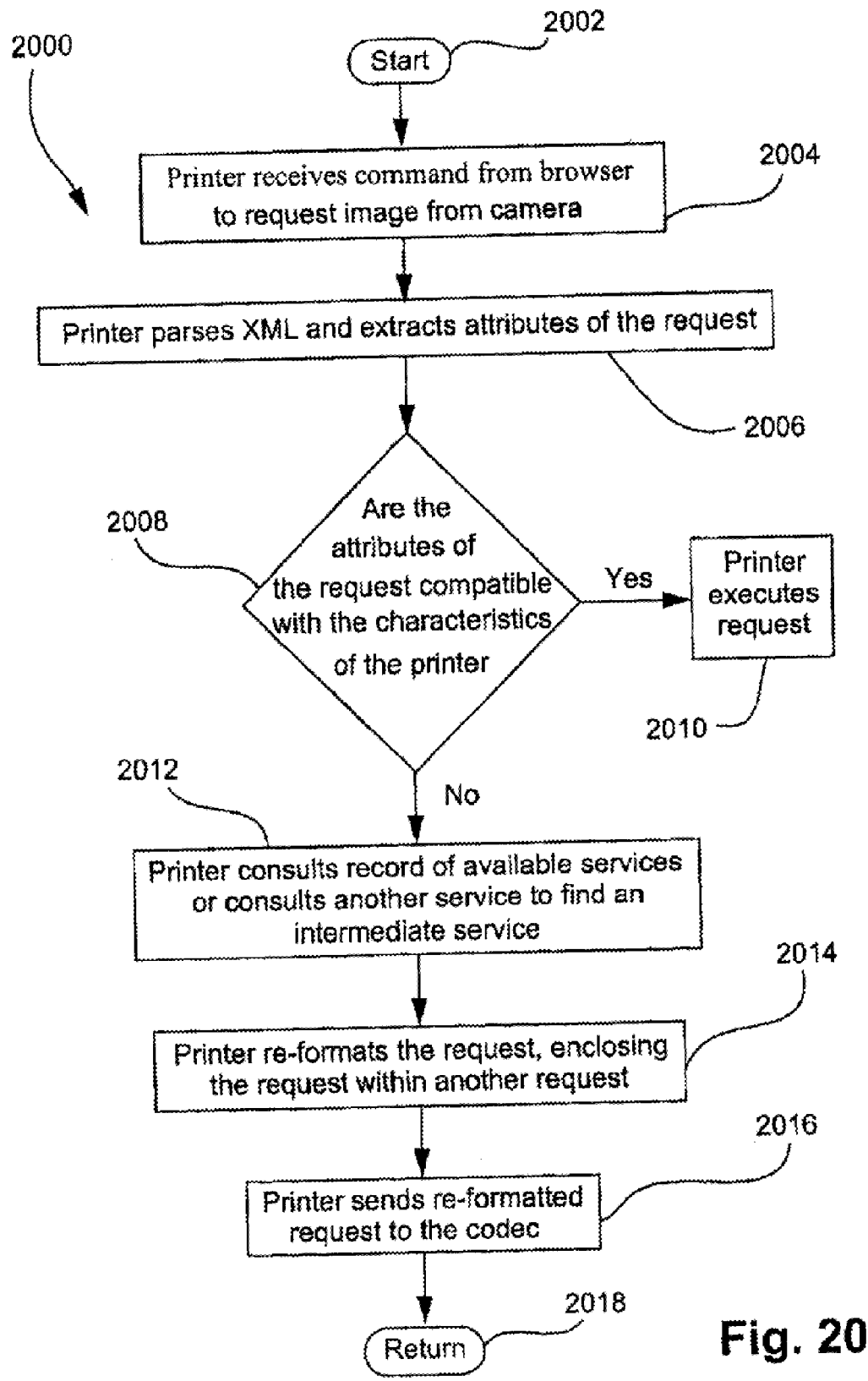
FIG. 20 is a flowchart showing the generating process of XML code fragment {10} after receiving XML code fragment {8} by a printer.

In an extension to Example 3, in which the browser 148 directed a printer 104 to retrieve and print an image from a camera 102, Example 4 depicts the situation where the printer 104 discovers that it does not have an input format compatible with the output format of the camera 102. It can be assumed that the printer 104 and its capabilities or attributes were previously identified to the browser 148. If the capabilities or attributes of the camera 102 were previously identified to the printer 104, then the printer 104 will be able to compare its input formats with the output formats of the camera 102 and decide if a direct match is available. In this example a direct match is not available. Alternatively, if the capabilities or attributes of the camera 102 were not previously identified or not previously fully identified to the printer 104 then the printer 104 might interrupt the example command sequence below with a describe request, discussed in Table A2 of the Appendix, to either the camera 102 or a similar information request about the camera 102 to an announcement/discovery service (if available). Thereafter, the printer 104 will make the comparison of input and output formats and decide if a direct match is available. This is depicted in the flowchart of FIG. 20 as a method 2000 for a pull service operation, where the method commences at step 2002. The code sequence associated with the method 2000 is as follows:

(i) Firstly the browser sends an image reference to the printer 104. Instead of sending the actual image, the browser 148 in step 2002 sends to the printer 104 the associated command (getData) to retrieve the image from the camera 102. The browser 148 need not have any understanding of the associated command (getData) it has sent to the printer 104. The XML code pertaining to this transfer is shown in code fragment {8}:

```
<Message from="http://host/browser"                    {8}
    to="http://host/printer"
    time="Tue Mar 23 14:14:01 EST 1999">
<data url="http://host/camera">
    <getData format="JPEG" name="images/301.jpg"/>
</data>
</Message>
```

(ii) The printer 104 then, in step 2006, parses the received XML to extract the attributes of the request. In this regard, the attributes of the request shown above are found in lines 4, 5 and 6 of code fragment {8}. In step 2008, the printer 104 then determines from the attributes if a direct I/O format match is available with the camera 102. The printer 104 need not have any understanding of the command (getData) it sends to the camera 102, although typically a device or service would check the format attribute value in the getData command for a match with its own input format capabilities. In this example, the only input format capability of the printer 104 is bitmap (.bmp) and so the printer 104 recognises a failed direct match between its input format and the output format of the camera 102. Accordingly, "NO" from step 2008 is asserted and step 2012 follows. Had there been a match determined in step 2008, the printer 104 according to step 2010 would then have executed the request and sent an XML code fragment {9} as follows:

```
<Message from="http://host/printer"                    {9}
    to="http://host/camera"
    time="Tue Mar 23 14:14:02 EST 1999">
<getData format="JPEG" name="images/301.jpg"/>
</Message>
```

(iii) In step 2012 the printer 104 instead requests/identifies an intermediate service. The printer 104 either consults its own record of available services, or consults another service (typically a discovery and/or announcement service or directory service) for a list of available services that might operate as an intermediate step between the printer 104 and the camera 102. There are many options at this point for how the printer 104 or a consulted discovery or directory service might select a suitable intermediate service or services. The options can be selected statically or dynamically based on the priorities of the system or its implementors. Table 1 illustrates examples of intermediate service selection options. Table 1 also describes a role of a directory service in chaining.

The printer 104 accordingly identifies a service that has a .bmp output format compatible with the input format of the printer 104. In this example, the printer 104 makes no check of the input format capabilities of the selected intermediate service. This behaviour is reasonable for a printer 104 that might normally have limited capability (for cost-reduction purposes). More capable selection and reasoning capability concerning intermediate services may be provided in other services or devices. In this example the discovered intermediate service is "http://host/codec", which is the URL of a codec device/service.

(iv) Step 2014 follows where the printer 104 wraps the camera image request inside a request to the identified intermediate device 108, this being shown in code fragment {10}:

```
<Message from="http://host/printer"                    {10}
    to="http: //host/codec"
    time="Tue Mar 23 14:14:03 EST 1999">
<getData format="BMP">
    <data url="http://host/camera">
        <getData format="JPEG" name="images/301.jpg"/>
    </data>
</getData>
</Message>
```

The printer 104 has requested a .bmp format image from the codec 108. The printer 104 has not specified a URL or filename within the codec 108 for the origin of the file that is desired. Rather, the printer 104 has provided a data statement containing a command for the camera 102.

Of the code shown in code fragment {10}, the following components thereof are generated by the printer 104:

```
<Message from="http://host/printer"                    {10A}
    to="http://host/codec"
    time="Tue Mar 23 14:14:03 EST 1999">
    {enclosure}
</Message>
```

The components of code fragment {10}, being a tag statement and indicated below as code fragment {10B}, are generated by the printer 104 from the received request by enclosing the extracted attributes within a new <getData></getData> XML entity, and inserting into the position labelled {enclosure} in code fragment {10A} above.

```
<getData format="BMP">                                 {10B}
    <data url="http://host/camera">
        <getData format="JPEG" name="images/301.jpg"/>
    </data>
</getData>
```

(v) Step 2016 follows where the printer 104 sends the request to the intermediate service (the codec) 108. The codec 108 then sends the image request to the camera 102. The codec service 108 need not understand the contents of the data statement, but only need forward the statement to the specified destination (the camera 102) and await the return of data. This is shown in code fragment { 11}.

```
<Message from="http://host/codec"                    {11}
    to="http://host/camera"
    time="Tue Mar 23 14:14:04 EST 1999">
<getData format="JPEG"name="images/301.jpg"/>
</Message>
```

(vi) The camera 102 sends the image to the codec 108, as shown in code fragment {12}:

```
<Message from="http://host/camera"                   {12}
    to="http://host/codec"
    time="Tue Mar 23 14:14:05 EST 1999">
<data>
    <image format="JPEG"name="images/301.jpg">
    <BASE64>image data</BASE64>
    <getData format="JPEG"name="images/301.jpg"/>
    </image>
</data>
</Message>
```

(vii) The camera 102 returns the requested data to the codec 108 and also (optionally) associates a getData command with the image.

(viii) The codec 108 processes the job and sends this to the printer 104. The codec 108 has an implied processing job to complete because of the discrepancy between the input and output formats of the data provided to it and requested from it. The codec 108 fulfils its obligation by understanding the implicit conversion command from the printer 104, and accordingly converts the (.jpg) format image from the camera 102 to a (.bmp) format image requested by the printer 104. Such implied commands can be controlled in more detail by external devices by attributes and parameters in the connecting device's/services interfaces or in explicit attributes or parameters in the commands and data provided to an intermediate device or service. Furthermore, explicit processing commands can be provided to an intermediate device or service.

The codec 108 returns the requested and processed camera data to the printer 104 as seen in code fragment {13} and also optionally associates a getData command with the image, as seen in code fragments {13A} or {13B}).

```
<Message from="http://host/codec"                    {13}
    to="http://host/printer"
    time="Tue Mar 23 14:14:06 EST 1999">
<data>
    <image format="BMP" name="images/301.bmp">
    <BASE64>image data</BASE64>
    <getData format="BMP" name="images/301.bmp"/>  {13A}
        OR
    <data url="http://host/camera">                {13B}
        <getData format="JPEG" name="images/301.jpg"/>
        </data>
    </image>
</data>
</Message>
```

The example above optionally shows the codec 108 adopting the image path name of the camera 102, but changing the image type. This new codec path name is then provided as a handle to the printer 104. The codec 108 is under no obligation to retain any similarity between its image path name and the image path name of the camera 102. However there are benefits if a predictable naming similarity is retained, especially if unrelated commands can be multiplexed then the printer 104 might need naming similarities to aid it in sorting which response belongs to which original request. One solution would be for the codec 108 to return its arbitrary image pathname to the printer 104 and provide an attribute indicating the original pathname (and possibly device) from which the printer 108 requested the image.

The associated getData command within the image tags may be returned from the codec 108 to the printer in a number of ways. For instance, if the codec 108 retains a cache of the converted image then the codec 108 may replace the associated command of the camera 102 with a version generated by the codec 108, as seen in XML code fragment {13A}, thereby removing the involvement of the camera 102 from any future request for that image. Alternatively, the codec 108 may wrap the associated getData of the request of the camera inside a data command identifying to which device the request should be directed if transmitted in future, as seen in XML code fragment {13B}). Therefore, in future, the printer 104 may send the associated data command with a nested getData command to the codec 108 and the codec 108 would then be able to relay the getData command to the camera 102.

The above example can be extended substantially indefinitely where the codec 108 can represent any number of devices or services involved in the pull chaining process between printer 104 and camera 102. As each device or service is enrolled into the chain, the command(s) originally sent by the printer 104 to the camera 102 can be nested inside a wrapper intended for the next device or service in-line. Similarly, any associated getData command included by the camera 102 in its returned data can be wrapped by each device or service on return to the printer 104. This wrapping or nesting will preserve the shape and details of the chain for the printer 104 if the printer 104 desires to activate the associated command of the camera 102. The passage of the associated command from the camera 102 back to the printer 104, if nested by each intermediate device, provides a description of the complete chain to the printer 104, allowing expedited reactivation of the chain at a subsequent time.

FIG. 7 illustrates a "push service provision" implementation, in contrast to the "pull service provision" implementation described in relation to FIG. 6. In FIG. 7, after the camcorder 1000 discovers and characterises the printer 1006, concluding that a profile mismatch exists, the camcorder 1000 discovers the resolution conversion device 1108 by a discovery announcement process depicted by a dashed arrow 1200. The camcorder 1000 ascertains the profile features 1110 of the resolution conversion device 1108 by a communication 1202, after which the camcorder 1000 directs the resolution conversion device 1108 and the printer 1006 to establish communications depicted by lines 1206 and 1208. Thereafter, the camcorder 1000 sends the high resolution picture information 1112 to the resolution conversion device 1108 as depicted by 1206, whereafter the information, having been resolution converted, is sent as depicted by 1208 to the printer 1006. An XML code example of a push service provision is now provided in Example 5 below.

EXAMPLE 5

XML Sequence of Push Service Provision for Camera/printer Mismatch.

The camera 102 has previously decided that a direct connection with the printer 106 is not possible and has discovered the codec 108 has a suitable JPEG input format. Similar discussion and explanation as provided in regard to Example 4 applies to the push-chaining sequence in this example.

(i) The camera 102 sends an image reference to the codec 108, according to code fragment {14}:

```
<Message from="http://host/camera"                        {14}
         to="http://host/codec"
         time="Tue Mar 23 14:14:00 EST 1999">
    <data url="http://host/printer">
        <image format="JPEG" name="images/301.jpg">
            <BASE64>image data</BASE64>
            <getData format="JPEG" name="images/301.jpg"/>
        </image>
    </data>
</Message>
```

(ii) The codec 108 processes the image, and then sends the image to the printer 106 according to code fragment {15}:

```
<Message from="http://host/codec"                         {15}
         to="http://host/printer"
         time="Tue Mar 23 14:14:01 EST 1999">
    <data>
        <image format="BMP" name="images/301.bmp">
            <BASE64>image data</BASE64>
            <getData format="BMP" name="images/301.bmp"/>
            OR
        <data url="http://host/camera">
            <getData format="JPEG" name="images/301.jpg"/>
        </data>
        </image>
    </data>
</Message>
```

In this example, the codec output format (.bmp), is expected. This is because either BMP is the only function provided by the codec 108, or alternatively, because the codec 108 will check the interface between the codec 108 with the printer 104. It is also possible for the camera 102 to imply, or alternatively, explicitly set an output format or a conversion function within the codec 108. One method of doing so is to add a file format attribute to the host printer URI which is provided in the fourth line of code fragment {14}. Accordingly, the host printer URI could take the alternate form

```
<data url="http://host/printer" format=BMP>.
```

Such a URI implies a conversion process, or an interface selection, to the codec 108.

The "pull service provision" implementation described in relation to FIG. 6, and the "push service provision" implementation described in relation to FIG. 7, differ in relation to the entity which initiates and defines the direction of the self generating chaining process. In the pull process, it is the printer 1006 which initiates the required device chain building to service the requirements of the camcorder 1000. In the push process, it is the camcorder 1000 which initiates building of the necessary chain of devices.

Two self generating chaining processes are now described. A preferred method is termed "local" chaining, and another chaining method, termed "centralised" chaining is also described.

Figure 8:
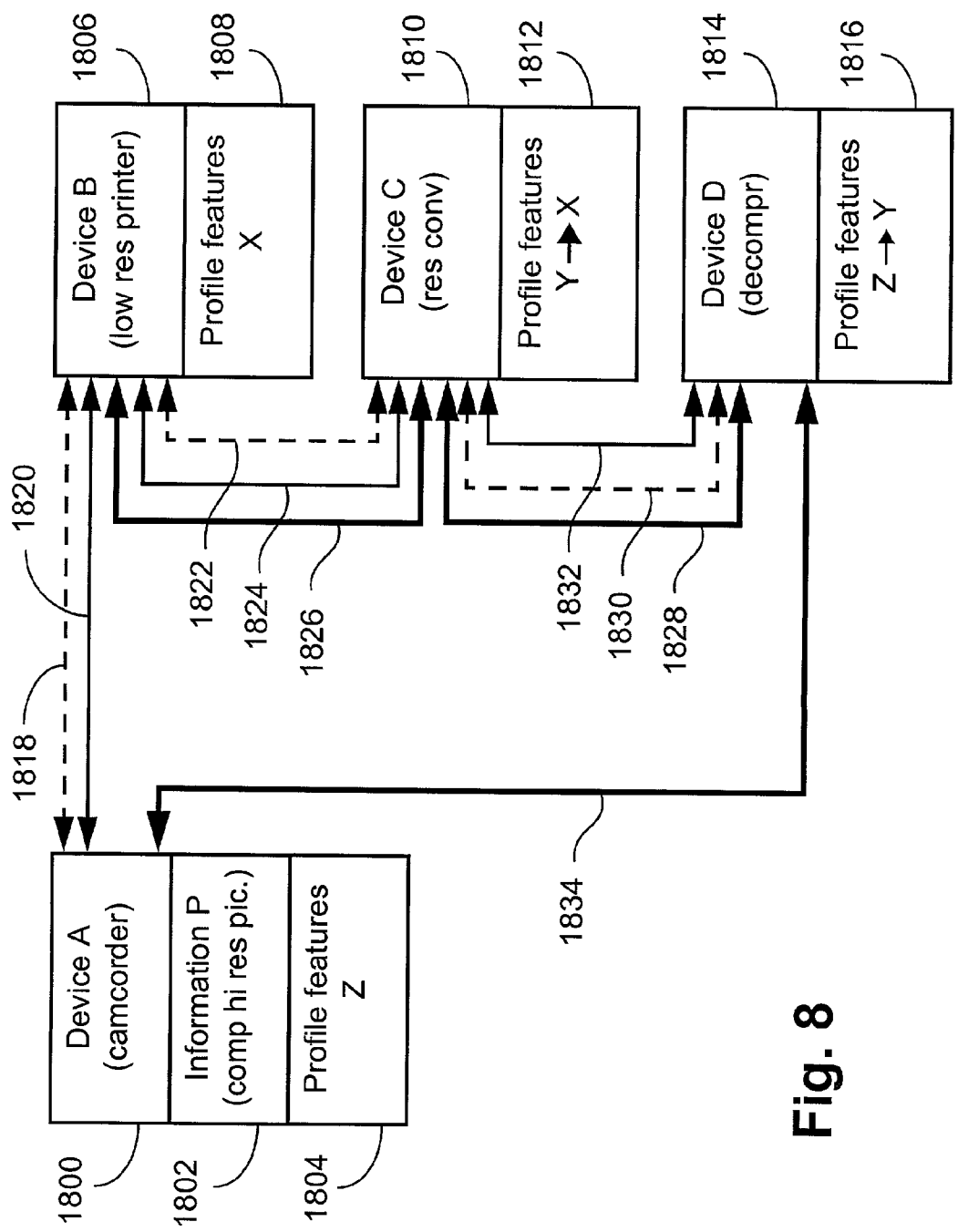
FIG. 8 shows "pull service provision" using local self-generating chaining for a plurality of interposing devices.

FIG. 8 depicts a local self generating chaining process applied to a more general case, where a plurality of interposing devices must be found, and a corresponding device chain established. A camcorder 1800 wishes to print compressed high resolution picture information 1802 which has an associated profile feature "Z" 1804. The camcorder 1800 discovers a low resolution printer 1806 by a discovery announcement process 1818. Profile information is exchanged as depicted by 1820, and a profile mismatch between the feature "Z" 1804 of the camcorder 1800 and the feature "X" 1808 of the printer 1806 is identified.

A pull service provision implementation, directed by the printer 1806, can now described. The printer 1806 searches for, but is unable to discover a single device which, alone, can be interposed in order to establish compatibility between the printer 1806, having a profile "X" 1808, and the camcorder 1800 having the profile "Z" 1804. Accordingly, the printer 1806 searches for one or more suitable devices with profile "X". Depending on a prevailing selection scheme, the printer 1806 will potentially select one of the discovered profile "X" devices to begin the chain building process. FIG. 8 shows that a device C, being a resolution converter 1810 is selected by the printer 1806, noting that the resolution converter 1810 has a profile with a conversion feature Y→X 1812. The printer 1806 passes an "image fetch" command to the resolution converter 1810, which proceeds to build the next link in the chain. This next link is built by the resolution converter 1810 by identifying devices with a compatible "Y" profile, to accord with the "Y" of the Y→X profile 1812. The resolution converter 1810 identifies and selects a device D, a decompressor 1814 as being suitable. The decompressor 1814 has a profile conversion feature Z→Y 1816. The decompressor 1814 now builds the next link in the chain after receiving the "image fetch" command from the printer 1806 via the resolution converter 1810. The decompressor 1814, recognising that its profile 1816 is compatible with that of the camcorder 1800, looks no further, and thus completes the chain with the camcorder 1800. This chain completion can be seen by considering the chain as follows:

- the "X" of the "Y→X" profile 1812 of the resolution conversion device 1810 is compatible with the "X" profile 1808 of the printer 1806;
- the "Y" of the "Z→Y" profile 1816 of the decompression device 1814 is compatible with the "Y" of the "Y→X" profile 1812 of the resolution conversion device 1810; and
- the "Z" profile 1804 of the camcorder 1800 is compatible with the "Z" of the "Z→Y" profile 1816 of the decompression device 1814.

The printer 1806 discovered the resolution conversion device 1810 by means of a discovery/announcement process 1822. Profile feature information was exchanged and negotiated by profile communication 1824. Similarly, the resolution conversion device 1810 discovered the decompressor device 1814 by means of a discovery/announcement process 1830. Profile feature information was exchanged and negotiated by profile communication 1832.

Finally, the printer 1806 directs the camcorder 1800, the decompression device 1814, and the resolution conversion device 1810 to establish communication to support the flow of the information 1802 from the camcorder 1800 to the decompression device 1814 as depicted by 1834, from the decompression device 1814 to the resolution conversion device 1810 as depicted by 1828, and finally from the aforementioned resolution conversion device 1810 to the printer 1806 as depicted by 1826.

Figure 9:
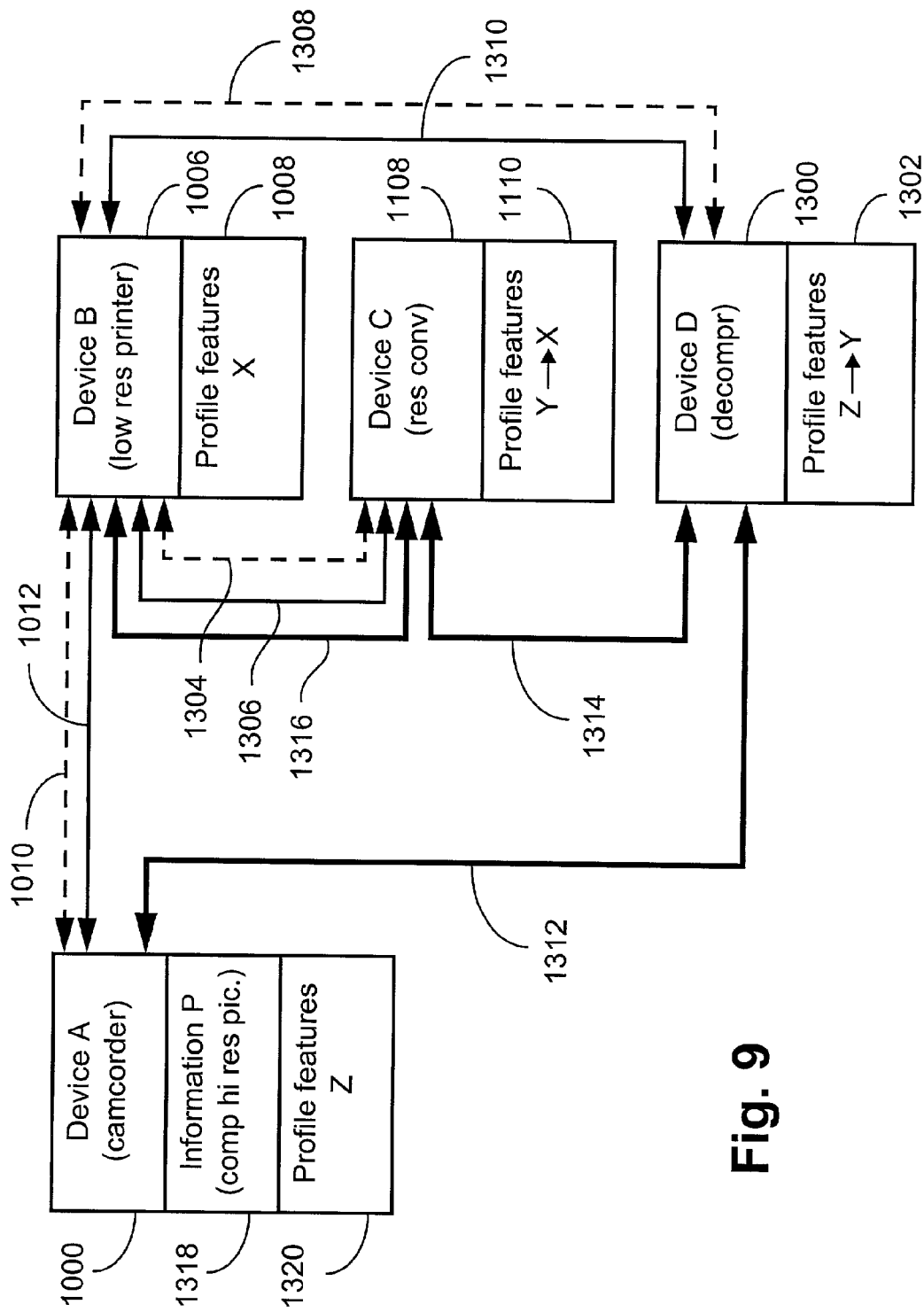
FIG. 9 shows "pull service provision" using centralised self-generating chaining for a plurality of interposing devices.

FIG. 9 depicts a centralised self generating chaining process applied to a more general case, where a plurality of interposing devices must be found, and a corresponding device chain established. The camcorder 1000 wishes to print compressed high resolution picture information 1318 which has an associated profile feature "Z" 1320. The camcorder 1000 discovers the low resolution printer 1006 by the discovery announcement process 1010. Profile information is exchanged as depicted by 1012, and a profile mismatch between the camcorder profile "Z" 1320 and the printer profile "X" 1008 is identified. A pull service provision implementation, directed by the printer 1006, can now described. The printer 1006 searches for, however is unable to discover a single device which, alone, can be interposed in order to establish compatibility between itself, having a profile "X" 1008, and the camcorder 1000, having the profile "Z" 1320. Accordingly, the printer 1006 searches for a pair of suitable devices. The printer 1006 identifies two devices, namely the resolution conversion device 1108 and a decompression device 1300, which in tandem can establish the necessary chain of service interworking. This can be seen by considering the following chain:

the "X" of the "Y→X" profile 1110 of the resolution conversion device 1108 is compatible with the "X" profile 1008 of the printer 1006;

the "Y" of the "Z-Y" profile 1302 of the decompression device 1300 is compatible with the "Y" of the "Y→X" profile 1110 of the resolution conversion device 1108; and the profile "Z" 1320 of the camcorder 1000 is compatible with the "Z" of the "Z→Y" profile 1302 of the decompression device 1300.

The printer 1006 discovered the resolution conversion device 1108 and the decompression device 1300 by means of discover/announcement processes 1304 and 1308 respectively. Profile feature information was exchange and negotiated by profile communication 1306 and 1310 respectively.

Finally, the printer 1006 directs the camcorder 1000, the decompression device 1300, and the resolution conversion device 1108 to establish communication as depicted by 1312, 1314, and 1316, to support flow of the information 1318 from the camcorder 1000 to the decompression device 1300 as depicted by 1312, from the decompression device 1300 to the resolution conversion device 1108 as depicted by 1314, and finally from the aforementioned resolution conversion device 1108 to the printer 1006 as depicted by 1316.

Figure 10:
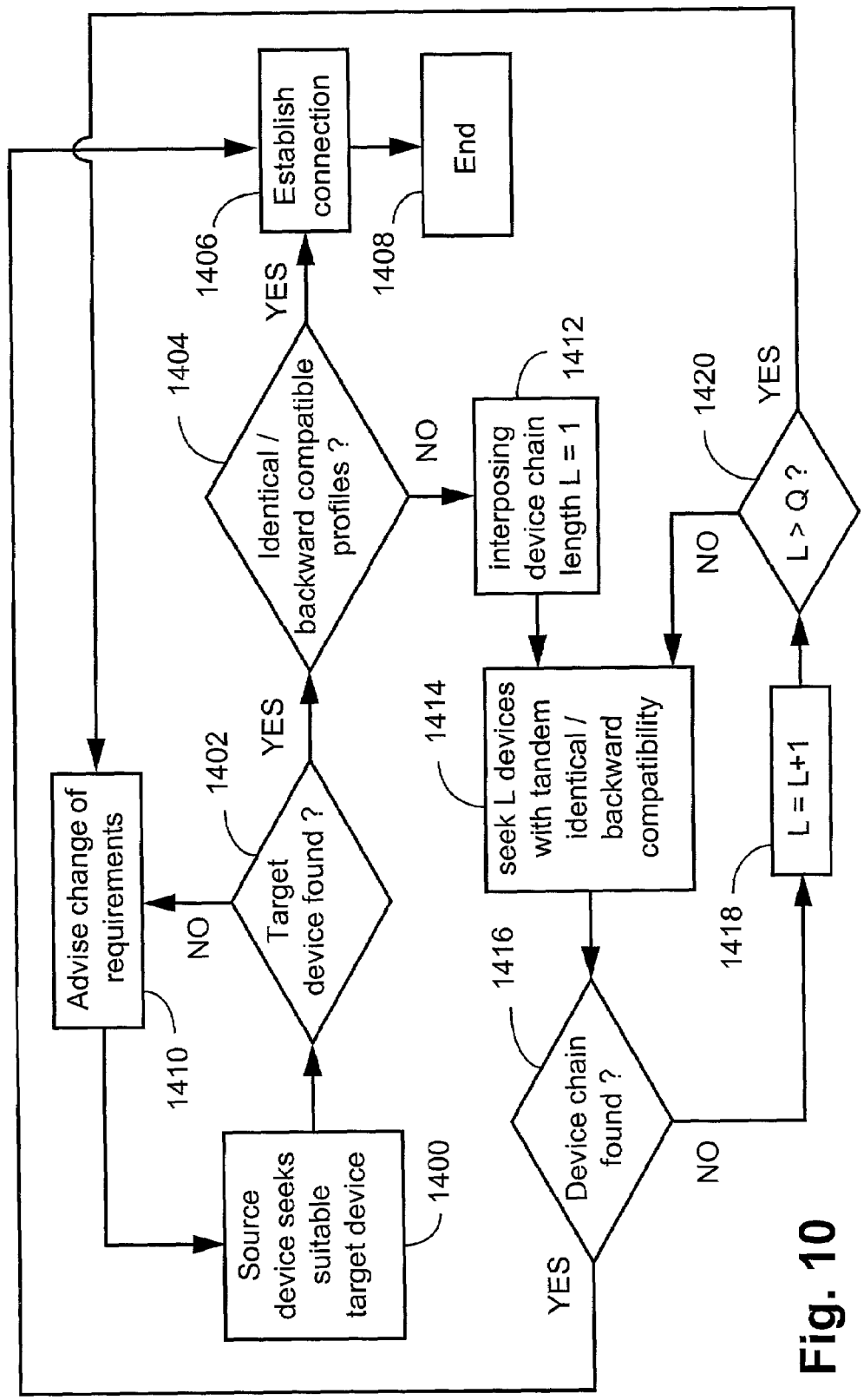
FIG. 10 illustrates a flow process for self-generating chaining.

FIG. 10 presents a process flow diagram by which the centralised self generating chaining process is performed in a push manner. The process is equally applicable to both pull and push service provision arrangements by exchanging actions of source and target devices. Commencing with a process 1400, a source device seeks a suitable target device. If the desired target device is found in a decision step 1402, the chaining process is directed to a further decision block 1404, where the profile compatibility is established. If profile compatibility, either exact or backward is established, the chaining process is directed in accordance with the "YES" arrow from the decision block 1404 to the connection establishment step 1406, and thereafter the chaining process ends at a step 1408. If a suitable target device is not found at the decision step 1402, the chaining process is directed in accordance with the "NO" arrow to the change requirements step 1410 which advises the source device that a change of requirements is in order, whereafter the chaining process returns to the initial process step 1400. If the decision step 1402 identifies a suitable target device, but profile compatibility is not found in the decision block 1404, the chaining process is directed in accordance with the "NO" arrow from the decision block 1404 to a process step 1412, where an index "L", this being the length of the interposing device chain to be sought, is set to 1.

The chaining process is then directed to a process step 1414, which searches for a chain of devices "L" long (L=1 at this stage), which, if interposed between the source and target devices, will provide tandem profile compatibility. Thereafter, in a decision block 1416, if an appropriate device chain is found, the chaining process is directed, as indicated by the "YES" arrow from the decision block 1416 to the connection establishment process 1406, and thereafter to the "end" block 1408. If, on the other hand, a suitable device chain with a single interposing device is not found in the decision step 1416, the chaining process is directed in accordance with the "NO" arrow from the decision step 1416 to a process step 1418, where the interposing device chain length, ie. "L", is incremented. Thereafter, a decision block 1420 tests that the length of the interposing chain of devices being sought is not longer than a predetermined maximum length "Q". If the chain is too long in the step 1420, the chaining process is directed, in accordance with a "YES" arrow from the decision block 1420 back to the "requirements change" process step 1410. If, on the other hand, the interposing device chain length has not yet reached the maximum length permissible, the chaining process is directed in accordance with the "NO" arrow from the decision block 1420 to the process step 1414. In this situation, again a chain of interposing devices is sought with the required tandem compatibility, this time the chain of devices being sought having been incremented in relation to the previous chain which was sought. In this manner, the chaining process flow continues until either a suitable chain of interposing devices is found, or until the permissible length of the interposing device chain is exceeded.

Although the centralised chaining process as described in relation to FIGS. 9 and 10 can be used, a decentralised approach can also be adopted. Accordingly, in a pull service implementation, the printer 1006 can search for only a single interposing device having a profile "X", and demand that such an interposing device interface with the camcorder 1000 which has a profile "Z". If the interposing device is unable to interface directly with the camcorder 1000, the interposing device repeats the aforementioned process, searching for only a single further interposing device, and demanding that the further interposing device interface with the camcorder 1000. This "local" search approach need not be aware of how many links there are in the chain and, from an XML coding perspective, commands are nested inside new commands for the interposing device just found. The flow in FIG. 10 is applicable in so much as each device in the chain successively obeys this flow with L=1 only in order to complete a chain.

Centralised chaining approaches can provide more optimal chaining solutions, however, they make more demands on devices, and/or on central network control and management. For example, considering FIG. 9, the printer 1006 is expected to be able to manage the centralised building of a chain, which would constitute a significant processing load for this device. The local chain building example of FIG. 8 would probably be applied in this instance. Decentralised, or local, control may provide less optimal solutions, and in some cases may even fail to converge on a solution. This approach is, however much easier to deploy. Convergence of a local chaining process is generally guaranteed if (i) the device solution space is constrained, in that there are a finite number of devices in the available pool, and if (ii) a solution exists, and (iii) if corrections can be made to the chain building process.

Figure 11:
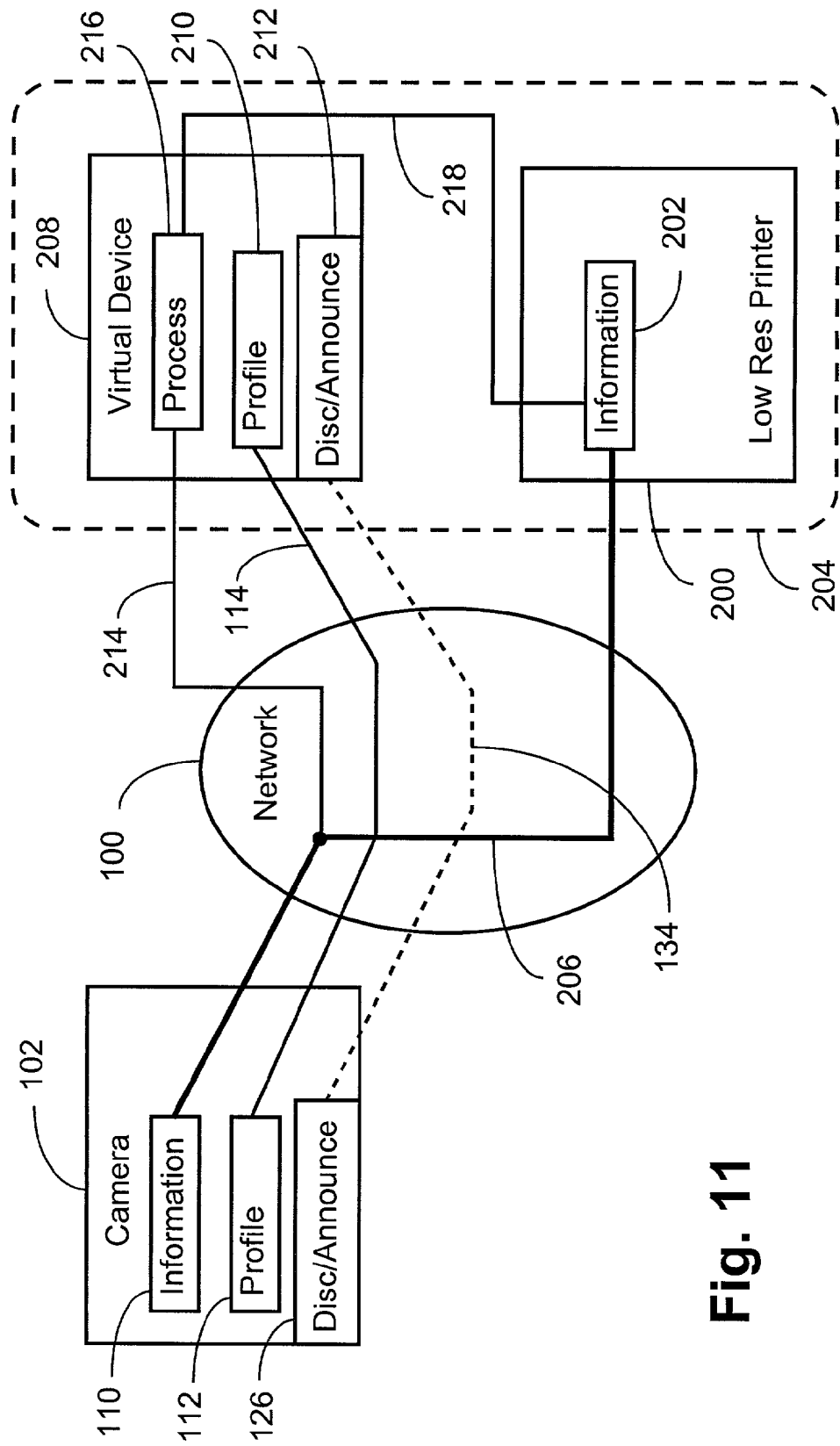
FIG. 11 depicts establishment of a communication session with a legacy device.

Turning to FIG. 11, a "legacy" (or "dumb") low resolution printer 200 having an information type 202 is associated with a "smart" "virtual device" 208. This association is depicted by the surrounding box 204. The virtual device 208 has no printing capability, but acts as the "intelligent" front end for the "dumb" printer 200. Thus when the camera 102 wishes to print the information 110, the profile processes 112, 210 of the camera 102 and virtual device 208 respectively conclude that the print job can proceed, whereafter communication is established as depicted by 206 between the camera 102 and the "dumb" printer 200 for printing. In this instance therefore, the intelligence and signalling communication capability are supplied by the virtual device 208, while the actual printing is supplied by the "dumb" printer 200. From a functional perspective therefore, the "dumb" legacy printer 200 has been incorporated into the system by means of the association with the virtual device 208 depicted by the box 204. Typically, the device 208 can provide an information channel (214, 218) and/or a processing step 216 to support the device 200, since the device 200 might be incapable of retrieving data directly from the camera 102.

Figure 12:
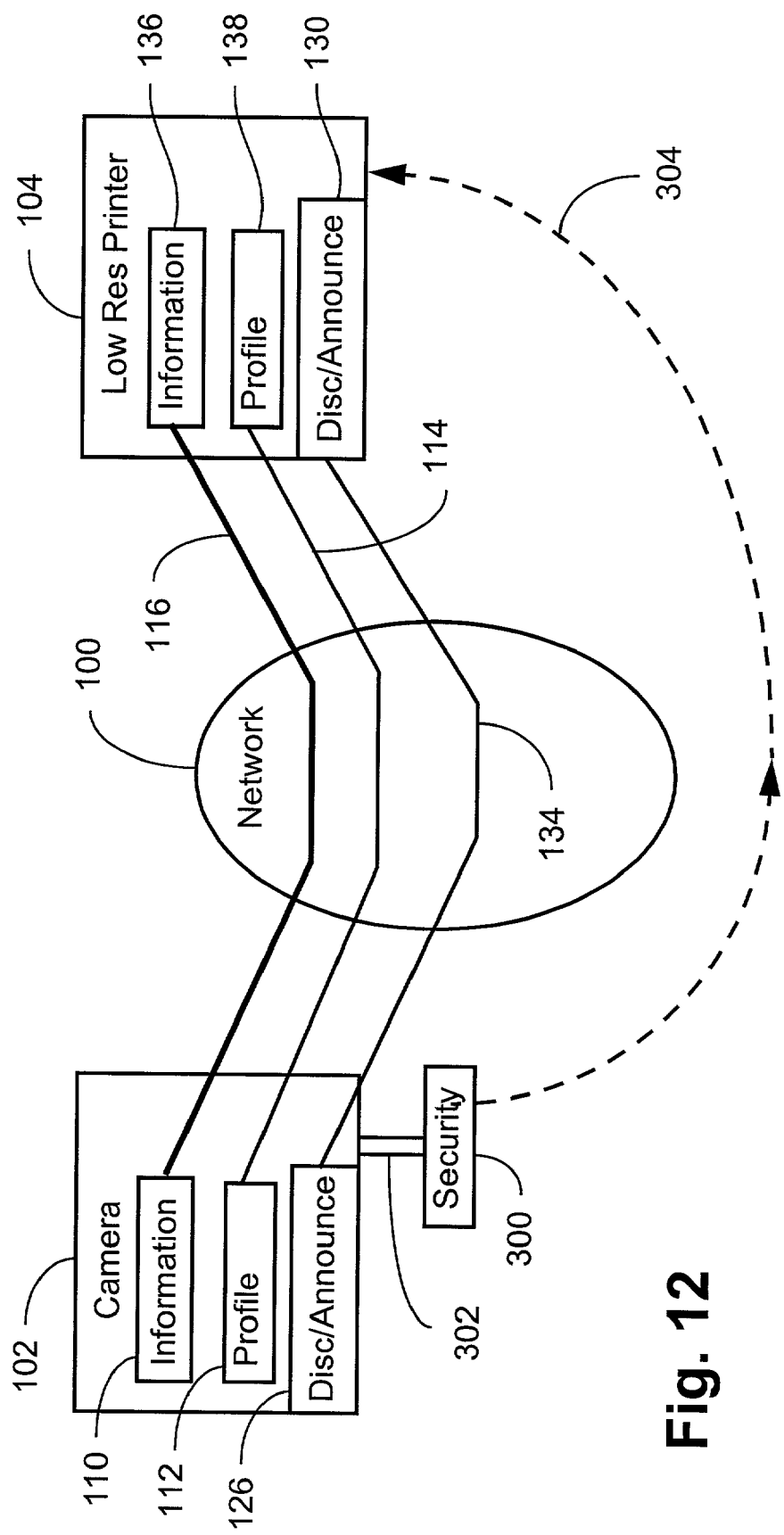
FIG. 12 illustrates a configuration for the incorporation of security features.

FIG. 12 depicts use of a physical security key 300 which is inserted into the initiating camera 102, the insertion depicted by a bar 302. The insertion of the security key 300 is accompanied, in some instances, by other control information (not shown). Insertion of the key 300 into the camera 102, allows the information 110 to be printed from the camera 102 to the printer 104, however, this does not permit the communications session to terminate. Thus, the process does not permit the printer 104 to output the printed pages until the security key 300 is equivalently inserted into the printer 104 as indicated by dashed line 304. This arrangement is termed "secure pick-up", and allows secure print jobs to be sent across the network 100. Such provides the initiating party with the assurance that the print job will not be output by the printer 104 until the print initiator (ie. the user) goes to the printer 104 and physically inserts the security key 300. Printing of the information 110 can be inhibited, requiring the security key 300 to be inserted at the destination printer 104 for enablement, and subsequent printing. Initial insertion of the key 300 is only required once, at setup of a sequence of print jobs, thereby avoiding a need to insert the key 300 for every print job. In another implementation, instead of inserting a physical key 300, cryptographic authorisation may be used whereby a public "inhibition" key can be sent openly to the camera 102, and a private "enablement" key embodied physically as the physical object 300, to be used only at the printer 104. Alternatively, or in addition, the data itself can be encrypted at the camera 102, using the public key prior to transmission across the network 100, and decryption at the printer 104 using the private key 300. This layered security approach provides for both encryption of the data within the network 100, and access security at the printer 104.

Figure 13:
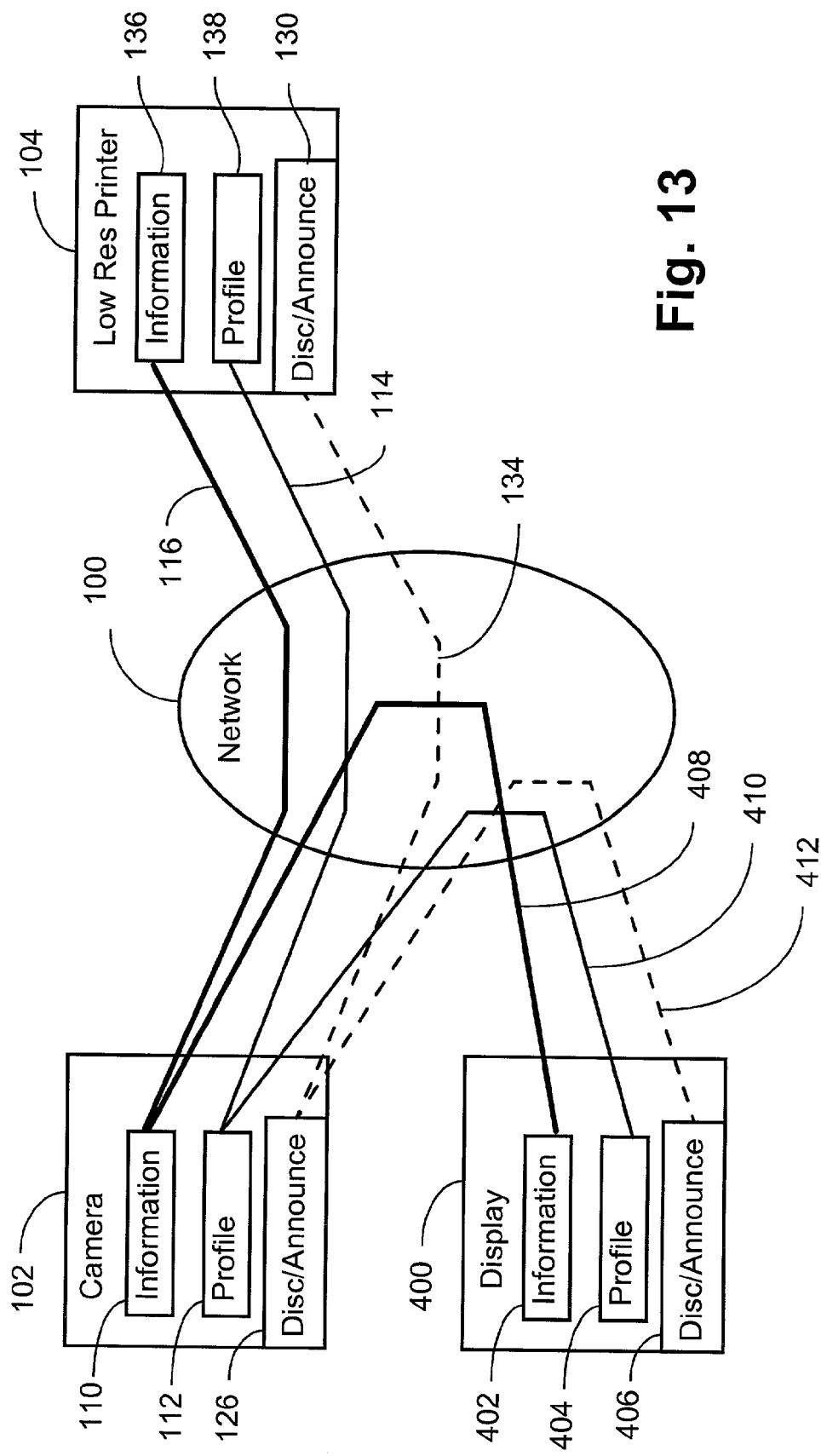
FIG. 13 illustrates use of a separate local display by an initiating device having a limited display capability.

FIG. 13 depicts a situation where an initiating device such as the camera 102 does not have sufficient display capability (eg. a GUI as previously described) to effectively inform the user about the devices and services populating the network 100. In this case, the camera 102 discovers a local display 400, using a discovery process 412. Profile matching between the camera profile 112 and the display profile 404 takes place as depicted by a line 410, whereafter if the profiles are found to be matching, either exactly or by backward compatibility, display communication 408 is set up between the camera 102 and the display 400. In this manner, the user of the camera 102 is able, using the relatively limited set of controls available on the camera 102, to observe a large display 400 which provides convenient and effective representation, and consequently control, of the various network resources so displayed. In the same manner, a control keypad associated with the display 400 can also be used instead of the relatively limited keypad functionality provided by the camera 102.

Figure 14:
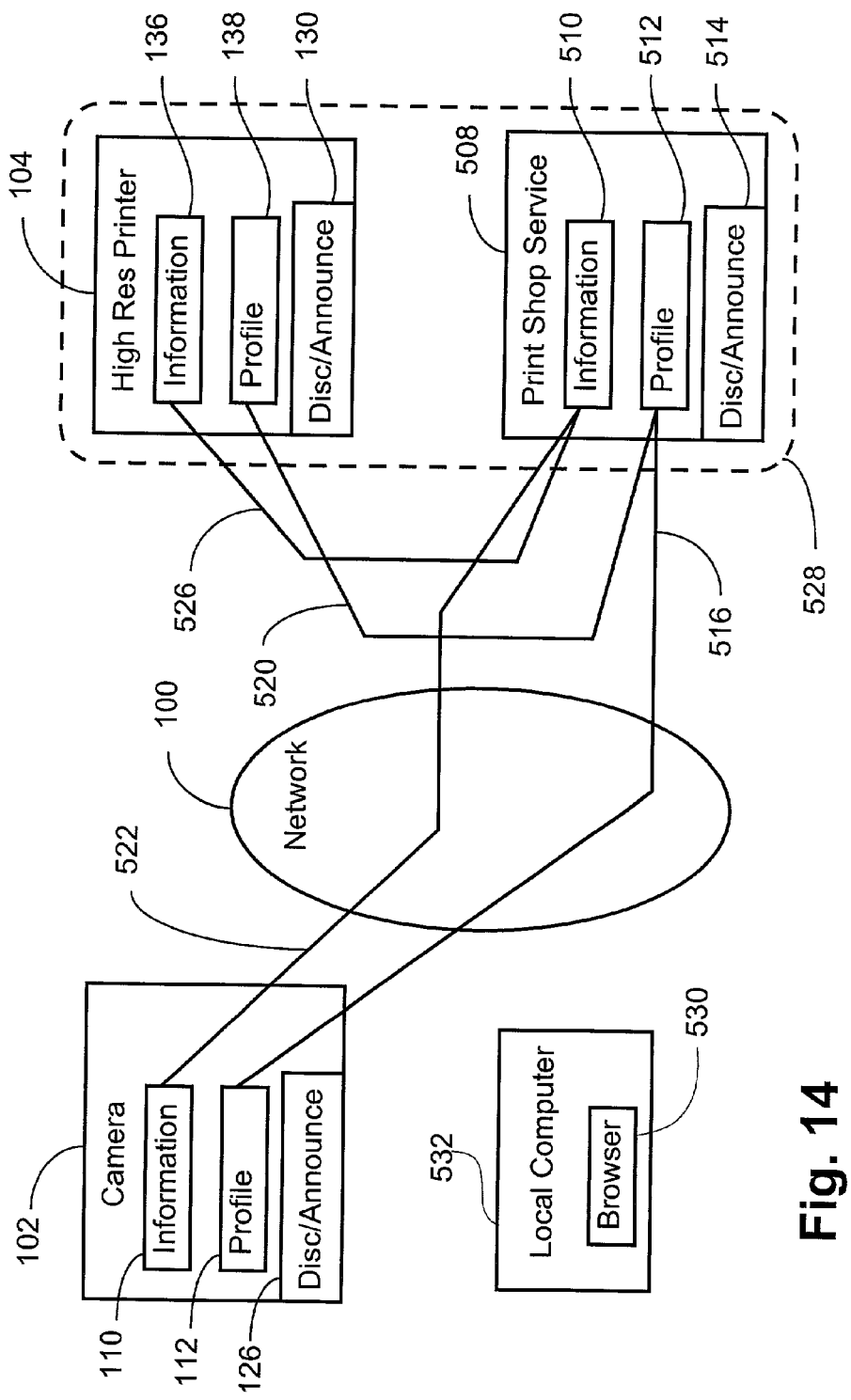
FIG. 14 illustrates an equivalence between devices and services.

FIG. 14 illustrates how the user of the camera 102 utilises a print shop service 508 in order to enhance the quality and attractiveness of the information 110, thereafter printing the information using a high resolution printer 104 of the print shop 528. The discovery/announcement processes previously described have been omitted for the sake of clarity. The camera 102 establishes profile matching with the print shop service 508, as depicted by a line 516. The camera 102 also provides the print shop service 508 with the desired service specifications and characteristics during the profile matching process. The print service 508 then performs profile matching 520 with the desired high resolution printer 104. The print shop service 508, having established profile matching, thereby determines that the service desired by the camera 102 is feasible, and then establishes communication 522 with the camera 102, pulling the information 110 to the print shop service 508. Thereafter, the print shop service 508 processes the camera information 110, and also incorporating title and descriptive textual information from its own archives (not shown). Once the print shop service 508 completes the processing as specified by the user of the camera 102, the service 508 establishes a communication session 526 with the high resolution printer 104, and sends the processed information to the printer 104, which produces the desired output. The foregoing description illustrates that services such as the print shop service 508 perform in the same manner as a physical device such as the high resolution printer 104 in the context of the present system. The user of the camera 102 can, providing a suitable display is available, view the population of devices (ie. 104) and services (ie. 508), and can formulate a command string or program to perform the set of desired services and actions. The user of the camera 102 does not need to adopt a different approach for devices and services. The distributed nature of the system architecture in the present arrangement enables services and virtual devices to reside in any convenient physical location. Indeed, the physical devices and their "intelligent" front ends need not necessarily reside in the same physical location.

Thus, for example, the print shop service 508 can, in principle, provide an intelligent front-end for all of the printers in a local network formed at the print shop 528, as it may, for instance, do so for the high resolution printer 104, which could be a legacy printer. In the event that the functionality provided by the limited set of camera control keys is insufficient, a control device 534 in the vicinity of the camera 102 (eg. a browser 530 running on a networked local computer 532) can be incorporated. Various options can be used for distributing functionality between the camera 102 and the local computer 532. For example, the local computer 532 can establish a dialogue with the print shop 528, to be followed by a command from the local computer 532 to the print shop 528 to commence a desired process. This command contains job details and a URI for the camera 102. The print shop528 thereafter initiates a pull process with the camera 102, which supplies the required data.

Figure 15:
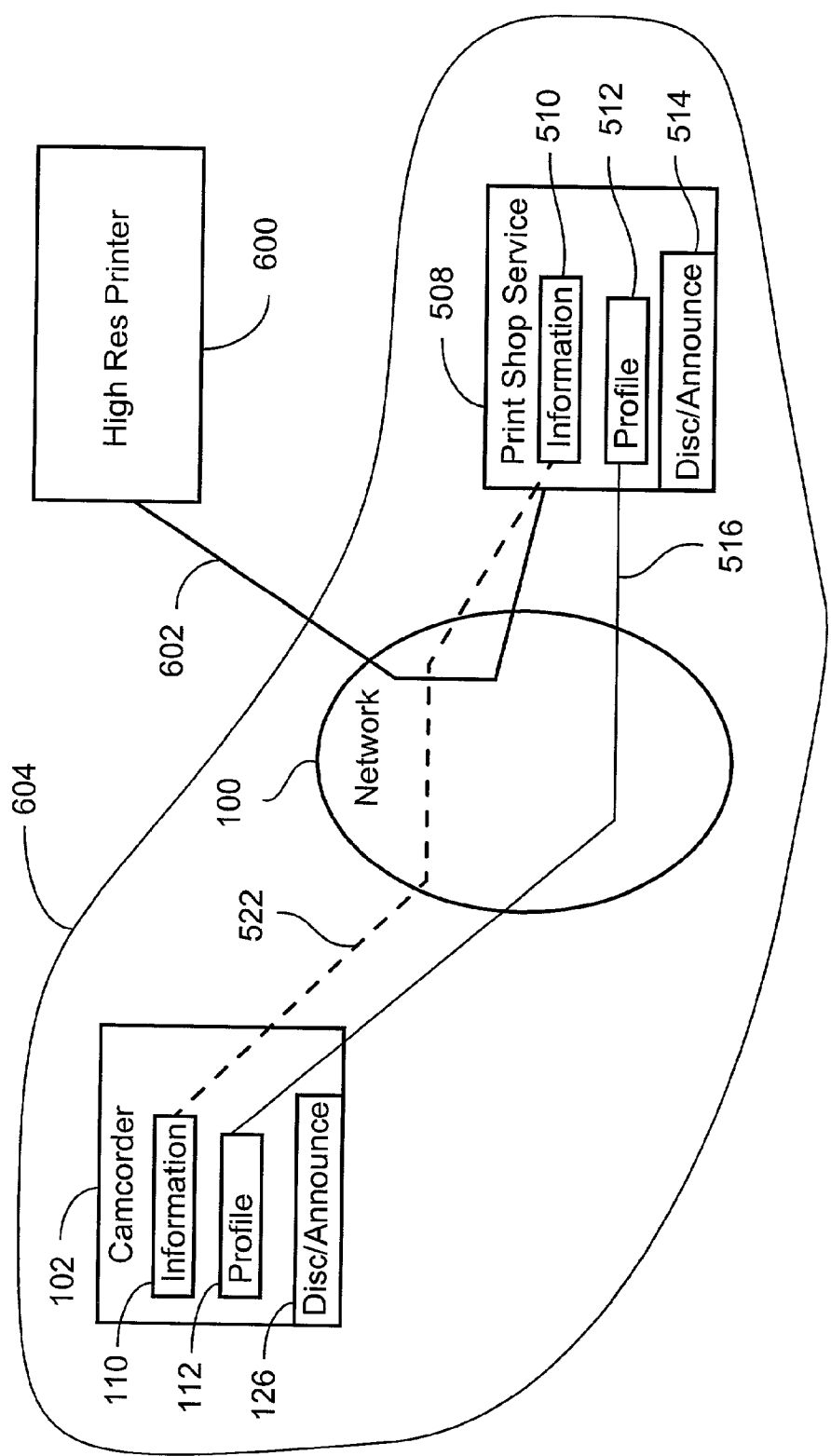
FIG. 15 depicts an extension of the capabilities of the described arrangements to an external network.

FIG. 15 illustrates how a remote device 600 which lies beyond a boundary 604 of the system previously described, can be accessed. Providing that the desired remote device, in this case a high resolution printer 600 resides at a known network address (eg. a Universal Resource Identifier or URI), communication as depicted by a line 602 can be established in order to send desired information 110 from the camera 102 to the printer 600. There need not be a discovery/announcement process in this case, nor need there be a profile matching process, and the information 110 is transmitted on the communication path 602 in an open-ended fashion to the printer 600. This mode of operation may or may not assume knowledge of the printer 600 capabilities, and an error in this regard may result in a failed print job if a profile matching method is not enabled. Security can be added in this scenario using public/private key inhibition/enablement, as described in relation to FIG. 12. Encryption can also be added as described.

Figure 16:
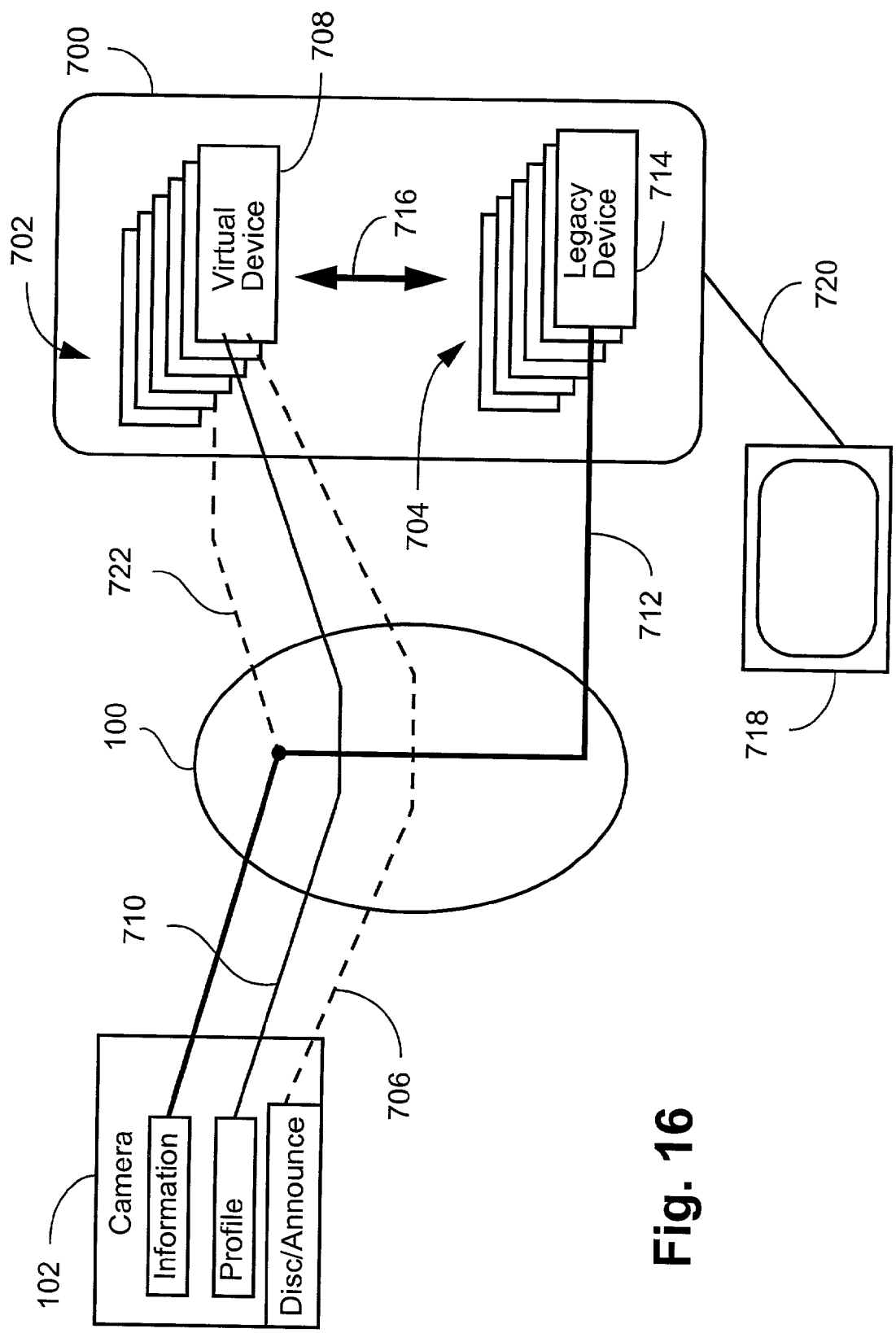
FIG. 16 illustrates use of a server with multiple legacy devices.

FIG. 16 illustrates how the virtual device concept depicted in FIG. 11 can be extended, in the event that the systems described herein have been only partially deployed. In this event, a server 700 contains a set of virtual devices 702 which are associated, on a one-for-one or other basis, with a set of legacy devices 704, the association being depicted by the arrow 716. The server 700 is also equipped with a display 718, connected by a line 720. The user of the camera 102 can discover the population of legacy devices 704 connected to the network 100 as exemplified by a discovery/announcement process 706. In a similar fashion, profile matching 710 can serve as the basis for establishing the capability of the population of devices 704. While it is the capability of the legacy devices 704 which is actually of interest to the user of the camera 102, as exemplified by an actual information path 712, the discovery/announcement and profile matching processes take place with the set of corresponding virtual devices 702. A dashed line 722 illustrates how the virtual devices can also provide data transfer and processing if required. The user of the camera 102 can use the server 700 and the associated server display 718 as a basis for constructing the desired services, and using the desired devices.

Figure 17:
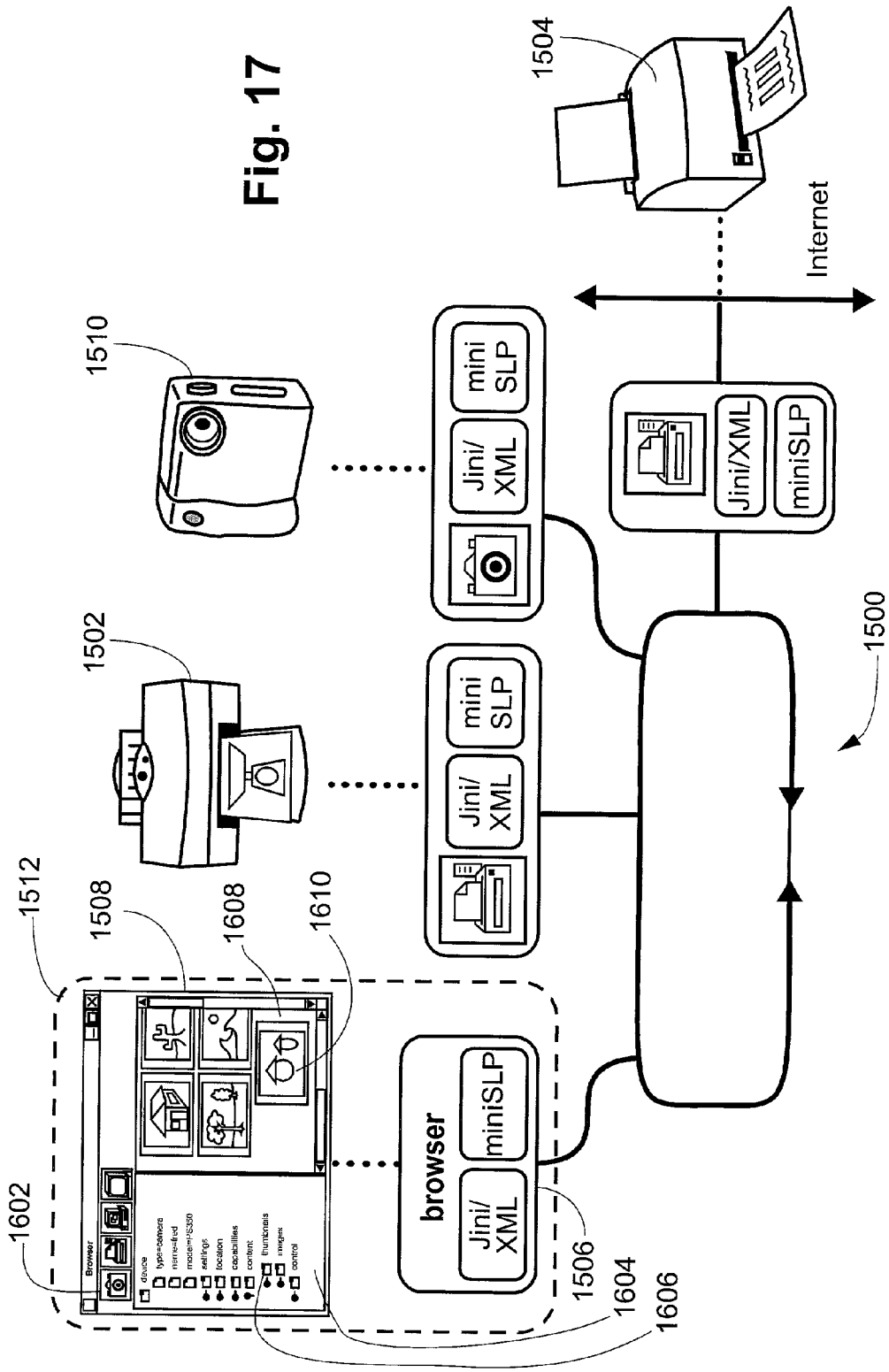
FIG. 17 shows an example of a preferred arrangement.
Figure 19:
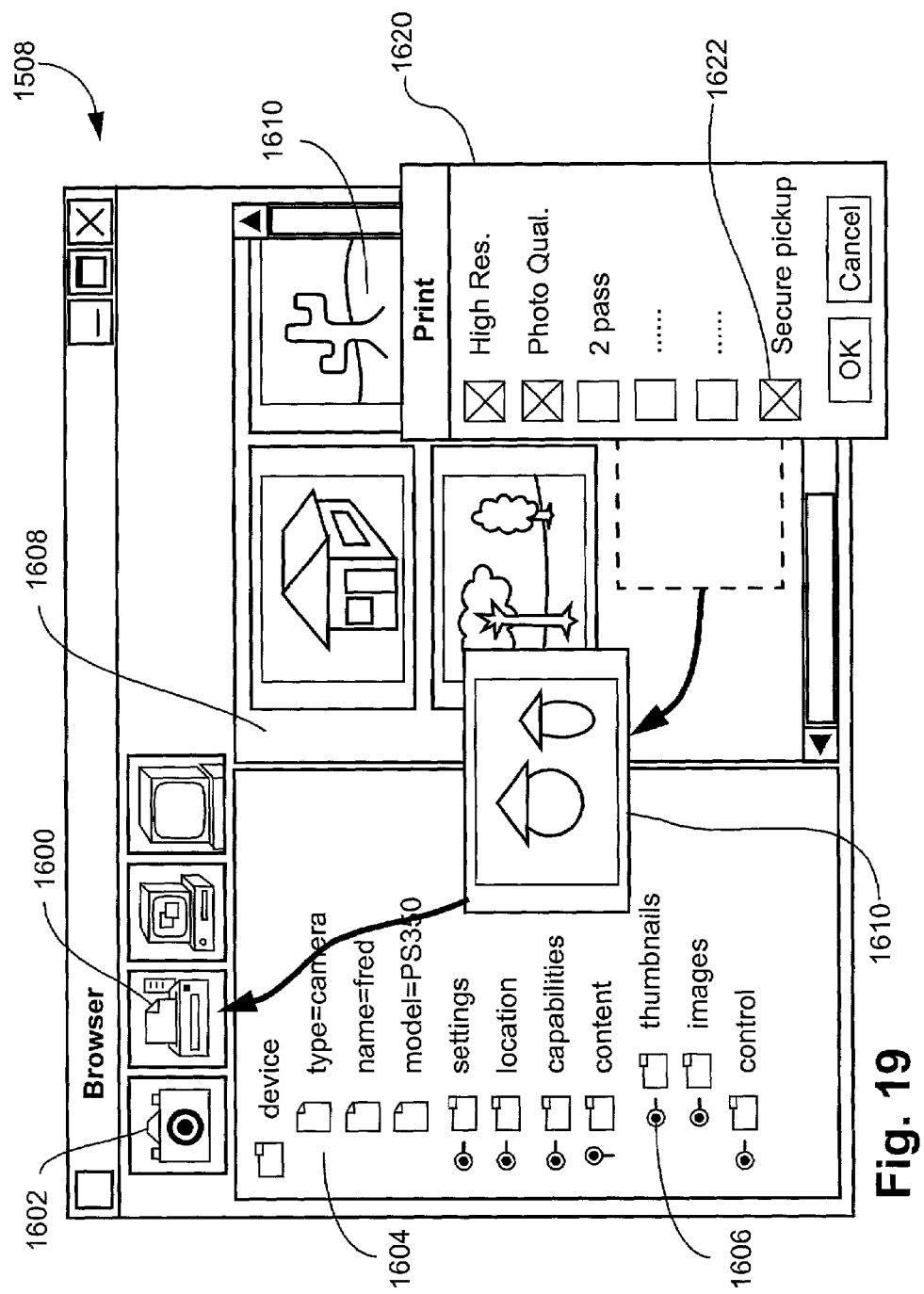
FIG. 19 depicts a print menu of a browser GUI.

FIG. 17 depicts a preferred implementation of the arrangements described above. A local network 1500 is shown, to which is connected a local printer 1502, and a remote printer 1504, the later being accessible via the Internet. A user connects a laptop computer 1512 into the local network 1500. Running on the laptop 1512 is a browser 1506. The browser 1506 provides a graphical user interface (GUI) 1508. The browser 1506 detects the printer 1502 on the local network 1500. A printer icon 1600, for example read from a device profile at discovery/announcement, appears at the top of the browser GUI 1508, as seen in FIG. 18. Next the user connects a digital camera 1510 to the network 1500. A camera icon 1602 appears on the browser window 1508. When the user selects the icon 1602, such causes a display of information 1604 about the camera 1510 in the left pane of the browser window 1508, such being a description of the camera 1510 in XML is displayed within a style sheet. Some of the items if information are visibly active. One item 1606, says "thumbnails". The user may select this item and a right pane 1608 of the GUI 1508 operates to display thumbnail representations 1610 of the stored images.

Where the user desired to print one image corresponding to the thumbnail 1610, the user selects the appropriate thumbnail 1610, for example using a mouse pointer device, and drags the thumbnail 1610 to the printer icon 1600 in the icon bar. To give extra control of the operation, this may be performed using the right mouse button. A menu 1620 appears as shown in FIG. 19. The user leaves most options on the menu unchanged from the default, however a "secure pickup" checkbox 1622 can be activated, followed by "OK". This sequence of events activates a print job whereby the selected image corresponding to the selected thumbnail 1610 is public-key encrypted, and sent to the printer 1502 for printing. The printing process is, however, suspended until the user later physically attend the printer 1502 and inserts a smartcard or Java Ring™ encoded with an appropriate matching private key, thus reinstating the print process by providing a corresponding private key in a secure manner ie only in his actual physical presence.

The described arrangement assumes that devices connect to a local IP network 1500. Before the browser 1506 can announce itself and look for other network services such as the printer 1502, the browser 1506 establishes itself on the network 1500. The browser 1506 does so by listening for incoming service requests on a port. Incoming service requests are HTTP requests, so a service is uniquely identified by an HTTP URL. For example, if the user's laptop 1512 upon which the browser 1506 is running has IP address 10.9.8.7 and the browser 1506 on the laptop 1512 listens on port 9090, then the URL HTTP://10.9.8.7:9090 identifies the browser 1506 so that other devices and/or services can make appropriate contact. Where multiple applications, or application instances, are running on one machine, and/or sharing the same ports, extensions can be added to a URL in order to uniquely identify the particulars of the case. For example, a file name-type of extension can be added to a URL in order to identify the application type. An example of such an extension is provided as follows:

http://10.9.8.7:9090/browser.exe

Each element in the URL extension, ie. "browser", and "exe", can identify details about the application name, and type, which are intended as a destination of a message.

Multiple instances of an application type can be uniquely identified by addition of an http query as a parameter-value pair. This is illustrated as follows:

http://10.9.8.7:9090/browser.exe?instance=1

The term "instance=1" represents a parameter and its associated value, these being used to identify a particular instance of an application. It is noted that the aforementioned methods may not, in a particular instance, all be required, depending on the particular application type or standardisation being employed.

Accordingly, a unique identity is assigned to each browser window.

The principles and arrangements described herein have general applicability to automatic network configuration and communication establishment. However, for ease of explanation, the implementations have been described with reference to a particular set of image devices and printers. However, it is not intended that the present invention be limited to the described implementations, and can be used to achieve interworking between other devices/services or groups of services/devices.

The aforementioned arrangements utilise particular methods of inter-device capability negotiation. Further, particular instances of discovery are described, where discovery relates to the ability of a device connected to a network to "discover" and identify other devices connected to the network. Variations of the described methods of inter-device negotiation, which use different negotiation processes may be implemented without departing from the scope of the present invention, which is defined in the appended claims.

A similar comment applies to the aspects of security incorporation, and device discovery. Further, one or more of the steps of the described methods may be performed in parallel (ie. simultaneously) rather than sequentially.

INDUSTRIAL APPLICABILITY

It is apparent from the above that the arrangements described are applicable to the telecommunications, data processing and distributed computing industries.

The foregoing describes only some embodiments of the present invention, and modifications and/or changes can be made thereto without departing from the scope of the present invention. The described embodiments should be considered to be illustrative and not restrictive.

Appendix

A number of XML syntax, command, and data examples are now provided.

TABLE A1

Example Basic Message Syntax

| Element Name | Context | Attributes | Description |
|---|---|---|---|
| Message | top | From: sender URL to: recipient URL time: time the message was sent xmlns: default namespace xmlns: device: device namespace | A Message contains a sequence of commands. |

TABLE A2

Example Basic Command Set

| Element Name | Context | Attributes | Description |
|---|---|---|---|
| new | Message | | New service is available. The content of this tag is the service description. |
| delete | Message | | Service is no longer available. |
| describe | Message | | Request a service description. |
| update | Message | | An updated or new service description (in answer to a describe, for example). The content of this tag is the service description. It could also be only part of its description, in case of a real update. |
| getData | Message | | Request for data. The content of this tag depends on the service; it is usually an excerpt from the service description. |
| data | Message | | Data sent by a service. The content of this tag is typically an image or a document. |
| set | Message | | Set a service parameter. |
| message | Message | status: "SUCCESS" or "ERROR" | Provides feedback information to a command. Content of this tag is a textual message. For example, a printer could answer "3 pages printed", or a camera could answer "command not supported". |

The following elements can occur inside a command: they define the basic data that services can exchange.

TABLE A3

Example Basic Data

| Element Name | Context | Attributes | Description |
|---|---|---|---|
| image | Data | Name format: "JPEG" or "GIF" | An image. The content of this tag is the actual data for the image (a BASE64 element) and a command (getData) to get the reference image. |
| BASE64 | Image | | Some binary data (currently used for images) encoded in base64. |
| Document | Data | name format: "XML" | A text document. The content of this tag is the actual document, which must be valid XML. |

The following are examples of service or device descriptions. Some attributes have been selected to match Jini(™) definitions for convenience and these are indicated with a $^J$ in the table.

TABLE A4

Example Basic Descriptions

| Element Name | Context | Attributes | Description |
|---|---|---|---|
| device | new, update | url xmlns: default namespace xmlns: device: device namespace | |
| identity | device | name$^J$ manufacturer$^J$ vendor$^J$ version$^J$ model$^J$ serialNumber$^J$ class owner | |
| location | device | slot floor$^J$ room$^J$ building$^J$ map$^1$ | The location tag is intended to provide information about the physical location of a service in a single building or on a small, unified campus. The map attribute should refer to a map image that can be displayed in the device browser. |
| address | device | street$^J$ organisation$^J$ organisationUnit$^J$ locality$^J$ stateOrProvince$^J$ postalCode$^J$ country$^J$ map | The address tag provides information about the physical location of a service in a large, geographically distributed organisation. |
| status | device | severity$^J$: "error", "warning", "notice", or "normal" value: "idle", "processing" or "stopped" msg: a message | Report the status of a service. |
| comment | device | comment$^J$ | A comment about a service. (for example, "this printer gets jammed if fed with overheads!") |

TABLE A4-continued

Example Basic Descriptions

| Element Name | Context | Attributes | Description |
|---|---|---|---|
| content | device | | The data held in the device. For example, the content for the camera is the pictures that were taken. |
| Commands | device | | The list of commands this device can accept |

In addition, all the elements above might have the following attributes:
  jini class is used to indicate which Jini class the element corresponds to.
  text value is a textual representation of the element, used when the device browser displays a list of devices in a tabular format. It can have one of the following values:
    #ATTR: get the textual representation from the element attributes
    #XML: the textual representation is the XML form of the element
    #CONTENT: get the textual representation from the text content
    #other: the given string is the textual representation Examples of camera specific, and computer specific, commands and elements are provided in the following tables.

TABLE A5

Example Basic Camera-Specific Commands & Elements

| Element Name | Context | Attributes | Description |
|---|---|---|---|
| camera: getData | Message | name: Image name format: "GIF" or "JPEG" | A request to get an image. This tag is always empty. |
| camera: thumbnails | content, getData | base: thumbnails directory refbase:reference images directory start: first thumbnail end: last thumbnail suffix: file suffix format: "GIF" or "JPEG" | The images currently in the camera, represented by thumbnails (small representation of the images). This tag is always empty. |
| camera: images | content, getData | base: image directory start: first image end: last image suffix: file suffix format: "GIF" or "JPEG" | The images currently in the camera. This tag is always empty. |

TABLE A6

Example Basic Computer Specific Commands & Elements

| Element Name | Context | Attributes | Description |
|---|---|---|---|
| computer: document | content, getData | name: name or description thumb: URL to a thumbnail image of the document | A document. This tag is always empty. |

TABLE A6-continued

Example Basic Computer Specific Commands & Elements

| Element Name | Context | Attributes | Description |
|---|---|---|---|
| | | href: URL to the document format: "XML" | |

We claim:

1. A method of establishing communication via a network between a first device and a second device, said first device and said second device forming a current chain of devices each having an associated profile, said method comprising:
   a determining step of determining an input/output profile match between all successive pairs of devices in the current chain of devices;
   a first establishing step of establishing, if the input/output profile match between all the successive pairs of devices in the current chain of devices is not found, the communication between said first device and said second device by interposing at least one additional device, said interposing forming a second chain of devices including the devices in the current chain of devices and said at least one additional device, wherein the first establishing step is performed by at least one of the devices in the current chain of devices;
   if an input/output profile match is not found between all the successive pairs of devices in the second chain of devices which comprises the devices in the current chain of devices and said at least one additional device, designating said second chain of devices which comprises the devices in the current chain of devices and said at least one additional device as the current chain of devices, and repeating the first establishing step; and
   a second establishing step of establishing, if the input/output profile match between all the successive pairs of devices in the current chain of devices is found, the communication between said first device and said second device without interposing said at least one additional device, wherein the second establishing step is performed by at least one of the devices in the current chain of devices.

2. The method according to claim 1, wherein said first establishing step comprises one of:
   forming the chain of devices commencing with said first device, proceeding to each said at least one additional device in succession, and concluding with said second device; and
   forming the chain of devices commencing with said second device, proceeding to each said at least one additional device in succession, and concluding with said first device.

3. The method according to claim 1, wherein each first device, second device, and additional device comprises one of a device or a service.

4. The method according to claim 1, wherein said first establishing step comprises a step of:
   interposing said at least one additional device between said first device and said second device to form said second chain of said devices, said interposing forming successive pairs of devices in said second chain so that the input/output profile match is established between all the successive pairs of said devices.

5. The method according to claim 4, wherein said interposing comprises one of the steps of:
- forming the chain of said devices commencing with said first device, proceeding to each said at least one additional device in succession, and concluding with said second device; and
- forming the chain of devices commencing with said second device, proceeding to each said at least one additional device in succession, and concluding with said first device.

6. The method according to claim 1, wherein said interposing comprises:
- a first specifying step of specifying one of said first device and said second device as a searching device;
- a searching step of searching said network from said searching device to identify an additional device coupled to said network and having an input/output profile match with said searching device to thereby form a pair of devices providing communication between said searching device and said additional device;
- a second specifying step of specifying said additional device as said searching device;
- repeating the searching step and second specifying step until a non-specified one of said first device and said second device from the first specifying step is identified as said additional device; and
- establishing the communication between said first device and said second device via said successive pairs of devices.

7. The method according to claim 6, wherein each said first device, second device, and additional device is selected from the group consisting of a device and a service.

8. The method according to claim 1, further comprising the steps of:
- if the input/output profile match between the first device and the second device is found, sending a message using a messaging protocol from the first device to the second device to establish a process between the first device and the second device, said process being dependent upon said message, said input/output profile match establishing a compatible mapping of the message between the first device and the second device; and
- if the input/output profile match between the first device and the second device is not found, sending the message using the messaging protocol from the first device via said at least one additional device to the second device to establish the process between the first device and the second device, said process being dependent upon said message, said input/output profile match between said each successive pair of devices establishing said compatible mapping of the message between the first device and the second device.

9. The method according to claim 8, whereby said interposing comprises:
- a first communicating step of communicating, by one of said first device and said second device of said message and a first address, to a first additional device, thereby forming a chain of successive pairs of devices among said first device, said second device and said first additional device, said communicating not requiring understanding by said communicating device of said message;
- an establishing step of establishing said process, dependent upon said message and said address, if an input/output profile match is established between each successive pair of devices, whereby said compatible mapping of said message is established from said first device to said second device;
- a second communicating step of communicating, by one of said first device, said second device and said first additional device, if said input/output profile match is not established between each successive pair of devices, of said message, said first address and a second address, to a second additional device, thereby forming successive pairs of devices among said first device, said second device, said first and said second additional devices, said communicating not requiring understanding by said communicating device of said message; and
- repeating the establishing step and the second communicating step until said process is established, said input/output profile match being established between each successive pair of devices, and said compatible mapping of said message being established from said first device to said second device.

10. The method according to claim 8, whereby said message comprises at least one of a command and a data value.

11. The method according to claim 8, whereby said messaging protocol is the Extended Markup Language, XML.

12. The method according to claim 1, wherein the input/output profile match is a partial profile match of the entire profile.

13. The method according to claim 1, wherein the interposing comprises the steps of:
- discovering if the input/output profile match between said first device and said second device is not found, at least one additional device; and
- announcing, by the at least one additional device, its presence.

14. An apparatus for use in a method of establishing communication via a network between a first device and a second device, said first device and said second device forming, when communicating, a current chain of devices each having an associated input/output profile, said apparatus constituting one of said first device and said second device and comprising;
- a determining means for determining an input/output profile match between all successive pairs of devices in a chain of devices;
- a first establishing means for establishing, if the input/output profile match between all the successive pairs of devices in the current chain of devices is not found, the communication between said first device and said second device by interposing at least one additional device, said interposing forming a second chain of devices including the devices in the current chain of devices and said at least one additional device;
- repeating means which, if an input/output profile match is not found between all the successive pairs of devices in the second chain of devices which comprises the devices in the current chain of devices and said at least one additional device, (i) designates the second chain of devices which comprises the devices in the current chain of devices and said at least one additional device as a current chain of devices, and (ii) repeats the process by the first establishing means; and
- a second establishing means for establishing, if the input/output profile match between all the successive pairs of devices in the current chain of devices is found, the communication between said first device and said second device without interposing said at least one additional device.

15. The apparatus according to claim 14, further comprising: searching means for searching the at least one additional device having an input/output profile match with the input/output profile of the device.

16. The apparatus according to either one of claims 14 and 15, further comprising:
   requesting means for requesting the at least one additional device for format conversion of data from an external device,
   wherein said first establishing means receives the converted data from the at least one additional device.

17. The apparatus according to claim 14, wherein the input/output profile match is a partial profile match of the entire profile.

18. A communication system comprising:
   a communication network:
   a plurality of devices coupled to said network, each said device comprising an apparatus as claimed in claim 14.

19. A computer-readable storage medium on which is stored a computer-executable program for controlling a processor of a device to execute the method as claimed in claim 1.

* * * * *

UNITED STATES PATENT AND TRADEMARK OFFICE
CERTIFICATE OF CORRECTION

PATENT NO. : 7,191,236 B2
APPLICATION NO. : 09/836163
DATED : March 13, 2007
INVENTOR(S) : Simpson-Young et al.

It is certified that error appears in the above-identified patent and that said Letters Patent is hereby corrected as shown below:

(56) REFERENCES CITED:
FOREIGN PATENT DOCUMENTS, "2249824" should read -- 2,249,824 --.

OTHER PUBLICATIONS:
in Goland, "issue" should read -- issued --; and "draftcal_ssdp_vl_03.txt." should read -- draftcai_ssdp_v1_03.txt. --;

in V.Tsaoussidis,: "Okaka, Japan" should read -- Osaka, Japan --;

in "Mini Service (1st occurrence): "edu/~pach/" should read -- edu/˷pach/ --;

in "Mini Service (2nd occurrence): "edu/~pach/" should read -- edu/˷pach/ --;

in "The Jini™: "boot⁻ spec.html>" should read -- boot - spec.html> --; and in P. Chandra: "On" should read -- in --.

(57) ABSTRACT:
Line 11, "step" should be deleted.

SHEET 20:
FIG. 20, in step 2004, "recievies" should read -- receives --.
As shown in the attached sheet COLUMN 1:
Line 25, "Network by" should read -- Network --;
Line 40, "(PC's)" should read -- (PCs) --;
Line 42, "PC's" should read -- PCs --;
Line 43, "PC however" should read -- PC --;
Line 47, "a" should be deleted; and
Line 48, "stove" should read -- stored --.

COLUMN 9:
Line 50, "it" should be deleted.

COLUMN 13:
Line 58, "now" should read -- now be --.

COLUMN 15:
Line 26, "had" should be deleted.

UNITED STATES PATENT AND TRADEMARK OFFICE
CERTIFICATE OF CORRECTION

PATENT NO.      : 7,191,236 B2
APPLICATION NO. : 09/836163
DATED           : March 13, 2007
INVENTOR(S)     : Simpson-Young et al.

It is certified that error appears in the above-identified patent and that said Letters Patent is hereby corrected as shown below:

COLUMN 16:
Line 10, "URI's" should read -- URIs --; and
Line 46, "personality; type;" should read -- personality, type, --.

COLUMN 17:
Line 22, "(eg" should read -- (e.g. --.

COLUMN 23:
Line 32, "fulfils" should read -- fulfills --.

COLUMN 24:
Line 24, "{13B})." should read -- {13B}. --.

COLUMN 27:
Line 15, "now" should read -- now be --; and
Line 39, "exchange" should read -- exchanged --.

COLUMN 30:
Line 64, "shop528" should read -- shop 528 --.

COLUMN 31:
Line 43, "later" should read -- latter --; and
Line 57, "if" should read -- of --.

COLUMN 32:
Line 8, "attend" should read -- attends --; and
Line 12, "ie" should read -- i.e. --.

COLUMN 35:
Line 17, "jini class" should read -- jini_class --;
Line 19, "text value" should read -- text_value --.

COLUMN 38:
Line 43, "comprising;" should read -- comprising: --.

COLUMN 39:
Line 5, insert a paragraph break before "searching means"; and
Line 8, "14 and" should read -- 14 or --.

UNITED STATES PATENT AND TRADEMARK OFFICE
CERTIFICATE OF CORRECTION

PATENT NO. : 7,191,236 B2
APPLICATION NO. : 09/836163
DATED : March 13, 2007
INVENTOR(S) : Simpson-Young et al.

It is certified that error appears in the above-identified patent and that said Letters Patent is hereby corrected as shown below:

COLUMN 40:
Line 5, "network:" should read -- network; and --.

Signed and Sealed this

Fifteenth Day of July, 2008

JON W. DUDAS
*Director of the United States Patent and Trademark Office*